(12) United States Patent
Delsman et al.

(10) Patent No.: US 11,608,398 B2
(45) Date of Patent: *Mar. 21, 2023

(54) PROCESS FOR MAKING PROPYLENE-BASED COPOLYMER

(71) Applicant: SABIC GLOBAL TECHNOLOGIES B.V., Bergen Op Zoom (NL)

(72) Inventors: Erik Delsman, Geleen (NL); Henrica Norberta Alberta Maria Steenbakkers-Menting, Geleen (NL); Gopala Krishna Surisetty, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 185 days.

This patent is subject to a terminal disclaimer.

(21) Appl. No.: 17/262,439

(22) PCT Filed: Jul. 25, 2019

(86) PCT No.: PCT/EP2019/070048
§ 371 (c)(1),
(2) Date: Jan. 22, 2021

(87) PCT Pub. No.: WO2020/021013
PCT Pub. Date: Jan. 30, 2020

(65) Prior Publication Data
US 2021/0355249 A1    Nov. 18, 2021

(30) Foreign Application Priority Data

Jul. 27, 2018 (EP) ...................................... 8186002
Jul. 25, 2019 (WO) ................. PCT/EP2019/070047

(51) Int. Cl.
C08F 210/16 (2006.01)
B01J 19/00 (2006.01)
(Continued)

(52) U.S. Cl.
CPC .............. C08F 210/06 (2013.01); C08F 2/01 (2013.01); C08F 4/646 (2013.01); C08F 4/654 (2013.01);
(Continued)

(58) Field of Classification Search
None
See application file for complete search history.

(56) References Cited

U.S. PATENT DOCUMENTS

| | | |
|---|---|---|
| 4,129,701 A | 12/1978 | Jezl et al. |
| 4,579,836 A | 4/1986 | Azoumanidis et al. |

(Continued)

FOREIGN PATENT DOCUMENTS

| | | |
|---|---|---|
| EP | 2602102 A1 | 6/2013 |
| EP | 2743073 A1 | 6/2014 |

(Continued)

OTHER PUBLICATIONS

International Search Report for International Application PCT/EP2019/070048, International Filing Date Jul. 25, 2019, dated Oct. 1, 2019, 6 pages.

(Continued)

*Primary Examiner* — Richard A Huhn
(74) *Attorney, Agent, or Firm* — Cantor Colburn LLP

(57) ABSTRACT

The invention relates to a process for production of copolymers, in particular for the polymerization of propylene, and another monomer chosen from a group comprising (Continued)

ethylene and a C4-C12 α-olefin in a horizontal stirred reactor comprising an agitated bed and several reaction zones for forming polymer particles.

14 Claims, 31 Drawing Sheets

(51) Int. Cl.

| | | |
|---|---|---|
| *C08F 210/06* | (2006.01) | |
| *C08F 2/01* | (2006.01) | |
| *C08F 4/646* | (2006.01) | |
| *C08F 4/654* | (2006.01) | |
| *C08F 210/02* | (2006.01) | |
| *C08F 210/14* | (2006.01) | |
| *C08F 210/08* | (2006.01) | |
| *C08L 23/16* | (2006.01) | |
| *C08L 23/20* | (2006.01) | |

(52) U.S. Cl.
CPC .......... *C08F 210/02* (2013.01); *C08F 210/08* (2013.01); *C08F 210/14* (2013.01); *C08L 23/16* (2013.01); *B01J 19/0053* (2013.01); *B01J 2219/182* (2013.01); *C08F 210/16* (2013.01); *C08L 23/20* (2013.01); *C08L 2314/02* (2013.01)

(56) References Cited

U.S. PATENT DOCUMENTS

| | | |
|---|---|---|
| 2013/0165613 A1 | 6/2013 | Marzolla et al. |
| 2014/0332109 A1* | 11/2014 | Cavalieri .............. C08F 210/06 138/140 |
| 2021/0292449 A1 | 9/2021 | Delsman et al. |

FOREIGN PATENT DOCUMENTS

| | | |
|---|---|---|
| EP | 3064548 A1 | 9/2016 |
| EP | 3447088 A1 | 2/2019 |
| WO | 0220147 A1 | 3/2002 |
| WO | 2011155999 A1 | 12/2011 |
| WO | 2018059955 A1 | 4/2018 |

OTHER PUBLICATIONS

International Serach Report for International Application No. PCT/EP2019/070047, International Filing Date Jul. 25, 2019, dated Oct. 1, 2019, 6 pages.

Written Opinion for International Application No. PCT/EP2019/070047, International Filing Date Jul. 25, 2019, dated Oct. 1, 2019, 7 pages.

Written Opinion for International Application PCT/EP2019/070048, International Filing Date Jul. 25, 2019, dated Oct. 1, 2019, 7 pages.

* cited by examiner

PROCESS FOR MAKING PROPYLENE-BASED COPOLYMER

CROSS REFERENCE TO RELATED APPLICATIONS

This application is a National Stage application of PCT/EP2019/070048, filed Jul. 25, 2019, which claims the benefit of European Application No. 18186002.4, filed Jul. 27, 2018, and PCT/EP2019/070047, filed Jul. 25, 2019, all of which are incorporated by reference in their entirety herein.

TECHNICAL FIELD OF THE INVENTION

The invention relates to a process for production of copolymer, in particular for the polymerization of propylene, and one other comonomer chosen from a group comprising ethylene and a C4-C12 α-olefin in a horizontal stirred reactor comprising an agitated bed for forming polymer particles.

STATE OF THE ART

The molecular weight of an olefin polymer, especially propylene polymers, typically is regulated by the use of hydrogen in the polymerization gas mixture. Generally speaking, a higher concentration of hydrogen will result in a lower molecular weight. The molecular weight distribution of the polymer composition, sometimes referred to as polydispersity, may affect polymer properties.

In horizontal stirred reactors, the average value of the distribution can be controlled by adjusting the inlet hydrogen flow rate to maintain a constant hydrogen to propylene ratio in the off-gas of the reactor. There is a direct link between the average chain length of the final polymer product and the gas phase hydrogen to propylene ratio.

WO2011/155999 describes a process for controlling $H_2$ distribution in a horizontal stirred bed reactor having more than one polymerization zones. In this process, the hydrogen concentration in the reaction zones are controlled by means of introducing quench liquids having different hydrogen concentrations to different reaction zones. $H_2$ is removed from part of the quench liquid. The $H_2$ lean quench liquid is added to the first reaction zone and the $H_2$ rich quench liquid is added to the subsequent reaction zone. By applying a hydrogen gradient along the horizontal stirred reactor, the molecular weight distribution is broadened.

The process of WO2011/155999 does not describe a process for polymerization of propylene, and another monomer chosen from a group comprising ethylene and a C4-C12 α-olefin, to which locations comonomer is to be fed, nor how the comonomer concentrations in the polymers produced in the reaction zones can be controlled.

SUMMARY OF THE INVENTION

It is an objective of the invention to provide a process for production of Copolymer, comprising propylene and another comonomer chosen from a group comprising ethylene and a C4-C12 α-olefin, in which the comonomer concentrations in the produced polymer inside the reaction zones can be controlled.

Accordingly, the invention provides a process for production of a polypropylene, comprising:
 propylene,
 a comonomer chosen from a group comprising ethylene and C4-C12 α-olefin, wherein the said process is performed in the presence of a catalyst system in a horizontal stirred reactor comprising:
 an agitated bed for forming polymer particles,
 a plurality of liquid feed ports that are subsequently arranged along a top side of the reactor above the agitated bed, the plurality of liquid feed ports comprising a first set of the liquid feed ports and a second set of the liquid feed ports arranged subsequent to the first set of the liquid feed ports in a downstream direction of the process, and
 a plurality of gas feed ports that are subsequently arranged along a bottom side of the reactor below the agitated bed, the plurality of gas feed ports comprising a first set of gas feed ports and a second set of gas feed ports arranged subsequent to the first set of gas feed ports in the downstream direction of the process,
wherein the process comprises the steps of:
 recovering a reactor off-gas comprising $H_2$, propylene, and said comonomer from the reactor,
 feeding the reactor off-gas to a condenser to form a gas-liquid mixture,
 feeding the gas-liquid mixture to a separator to obtain a first gas stream and a first liquid stream:
  the first gas stream comprising:
   $H_2$,
   propylene, and
   the comonomer, in an higher mole fraction than in the first liquid stream when it is lighter than propylene, and
  the first liquid stream comprising:
   $H_2$,
   Propylene, and
   the co monomer, in an higher mole fraction than in the first gas stream when it is heavier than propylene,
 wherein fresh propylene is further fed to the separator and/or added to the first liquid stream),
 feeding the catalyst system to the reactor through a port arranged on the top side of the reactor,
 feeding a $H_2$ poor quench liquid comprising propylene through the first set of the liquid feed ports,
 feeding a $H_2$ rich quench liquid comprising:
  $H_2$,
  Propylene, and
  The comonomer,
 to the reactor through the second set of liquid feed ports, wherein the $H_2$ rich quench liquid comprises at least part of the first liquid stream,
 feeding a $H_2$ poor bottom gas comprising fresh propylene through the first set of gas feed ports,
 feeding a $H_2$ rich bottom gas comprising:
  $H_2$,
  Propylene, and
  the comonomer
 through the second set of gas feed ports, wherein the $H_2$ rich bottom gas comprises at least part of the first gas stream, and
 collecting the polymer particles formed in the agitated bed from the reactor, wherein the said process comprises the further following steps:
  the comonomer when it is lighter than propylene, is fed to:
   the reactor as
    a part of the $H_2$ poor bottom gas and/or
    as part of the $H_2$ rich bottom gas
   and/or fed to the separator the comonomer when it is heavier than propylene, is fed:
  to the reactor as:
    a part of the $H_2$ poor quench liquid and/or
    a part of the $H_2$ rich quench liquid
    and/or to the separator.

It will be appreciated that the term "C4-C12 α-olefin" means an α-olefin having 4 to 12 carbon atoms. Preferably, in some embodiments, the C4-C12 α-olefin is selected from 1-butene, 1-hexene, 1-octene or mixtures thereof.

More preferably, in some embodiments, the comonomer chosen from a group comprising ethylene, C4-C12 α-olefin is ethylene.

In some embodiment, the comonomer chosen from a group comprising ethylene, C4-C12 α-olefin is 1-butene.

In some embodiment, the comonomer chosen from a group comprising ethylene, C4-C12 α-olefin is 1-hexene.

In some embodiments, a part of the first liquid stream is fed to a $H_2$ stripper (260, 360) to remove $H_2$ to form a second liquid stream comprising propylene and the comonomer.

In some embodiments, at least part of the second liquid stream is fed to the reactor as a part of the $H_2$ poor quench liquid.

In some embodiments, at least part of the second liquid stream Is vaporized and fed as a part of the $H_2$ poor bottom gas.

In some embodiments, the reactor off-gas Is fed to a cyclone located between the reactor and the condenser, wherein polymer particles are carried back from the cyclone to the reactor by means of the $H_2$ poor gas stream.

In some embodiments, the catalyst system is a Ziegler-Natta catalyst system, wherein the Ziegler-Natta catalyst system comprises a procatalyst, a co-catalyst and optionally an external electron donor, wherein the procatalyst id obtained by a process comprising the steps of Step A) providing or preparing a compound $R^4_z MgX^4_{2-z}$
  wherein
    $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;
    $X^4$ is independently selected from the group consisting of fluoride (F—), chloride (Cl—), bromide (Br—) or iodide (I—), preferably chloride;
    z is in a range of larger than 0 and smaller than 2, being $0<z<2$;
Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$
  wherein
    $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
    $X^1$ is independently selected from the group consisting of fluoride (F—), chloride (Cl—), bromide (Br—) or iodide (I—), preferably chloride;
    n is in range of 0 to 4, preferably n is from 0 up to and including 1;
    z is in a range of larger than 0 and smaller than 2, being $0<z<2$;
    x is in a range of larger than 0 and smaller than 2, being $0<x<2$;
Step C) activating said solid support, comprising two sub steps:
  Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and
  Step C2) a second activation step by contacting the activated solid support obtained in step C1) with an activating electron donor; to obtain a second Intermediate reaction product;
Step D) reacting the second intermediate reaction product obtained step C2) with a halogen-containing TI-compound, optionally an activator prior to or simultaneous with the addition of an Internal donor, and at least one Internal electron donor to obtain said procatalyst.

In some embodiments, the reactor is provided with two reaction zones that are arranged subsequent to each other in the downstream direction of the process, wherein
  a first reaction zone of said two reaction zones is fed with the $H_2$ poor quench liquid and the $H_2$ poor bottom gas, and
  a second reaction zone of said two reaction zones Is fed with the $H_2$ rich quench liquid and the $H_2$ rich bottom gas.

In some embodiments, the reactor is provided with three reaction zones that are arranged subsequent to each other in the downstream direction of the process, wherein
  a first reaction zone of said three reaction zones Is fed with the $H_2$ poor quench liquid and the $H_2$ poor bottom gas,
  a second reaction zone of said three reaction zones Is fed with either
    i) the $H_2$ poor quench liquid and the $H_2$ rich bottom gas, or
    ii) the $H_2$ rich quench liquid and the $H_2$ poor bottom gas, and
  a third reaction zone of said three reaction zones Is fed with the $H_2$ rich quench liquid and the $H_2$ rich bottom gas.

Another aspect of the Invention is a polypropylene composition obtained by or obtainable by the process according to the Invention.

Another aspect of the invention is a setup assembly for the production of polypropylene comprising at least:
  A horizontal stirred reactor comprising
    an agitated bed for forming polymer particles with at least two reaction zones,
    a plurality of liquid feed ports that are subsequently arranged along a top side of the reactor above the agitated bed, the plurality of liquid feed ports comprising a first set of the liquid feed ports and
a second set of the liquid feed ports arranged subsequent to the first set of the liquid feed ports in a downstream direction of the process, and
a plurality of gas feed ports that are subsequently arranged along a bottom side of the reactor below the agitated bed, the plurality of gas feed ports comprising
a first set of gas feed ports and
a second set of gas feed ports arranged subsequent to the first set of gas feed ports in the downstream direction of the process
a plurality of off-gas ports arranged along a top side of the reactor above the agitated bed in a downstream direction of the process
a recycle loop comprising
a condenser connected to the horizontal stirred reactor by the plurality of off-gas ports, and
a separator connected
to the condenser by a gas liquid mixture line and
to the horizontal stirred reactor by
a first liquid stream line to the second set of the liquid feed ports, and
a first gas stream line to the second set of gas feed ports.

In some embodiments, the setup assembly also comprise a stripper configured to remove at least $H_2$ and connected:
to the separator through the first liquid stream line,
to the first set of the liquid feed ports of horizontal stirred reactor through a second liquid stream line configured to carry on a $H_2$ poor quench liquid produce by the stripper, and
to the condenser through a stream line.

In some embodiments, the setup assembly is configured to carry out the process according to the invention.

Presentation of the Invention

The invention is to provide a process for production of a copolymer, comprising:
propylene,
a comonomer chosen from a group comprising ethylene and C4-C12 α-olefin, wherein the said process is performed in the presence of a catalyst system in a horizontal stirred reactor comprising:
an agitated bed for forming polymer particles,
a plurality of liquid feed ports that are subsequently arranged along a top side of the reactor above the agitated bed, the plurality of liquid feed ports comprising a first set of the liquid feed ports and a second set of the liquid feed ports arranged subsequent to the first set of the liquid feed ports in a downstream direction of the process, and
a plurality of gas feed ports that are subsequently arranged along a bottom side of the reactor below the agitated bed, the plurality of gas feed ports comprising a first set of gas feed ports and a second set of gas feed ports arranged subsequent to the first set of gas feed ports in the downstream direction of the process,
wherein the process comprises the steps of:
recovering a reactor off-gas comprising $H_2$, propylene, and said comonomer from the reactor,
feeding the reactor off-gas to a condenser to form a gas-liquid mixture,
feeding the gas-liquid mixture to a separator to obtain a first gas stream and a first liquid stream:
the first gas stream comprising:
$H_2$,
propylene, and
the comonomer in an higher mole fraction than in the first liquid stream when it is ethylene and
the first liquid stream comprising:
$H_2$,
Propylene, and
the comonomer in an higher mole fraction than in the first gas stream when it is chosen from a group comprising C4-C12 α-olefin,
wherein fresh propylene is further fed to the separator and/or added to the first liquid stream,
feeding the catalyst system to the reactor through a port arranged on the top side of the reactor,
feeding a $H_2$ poor quench liquid comprising propylene through the first set of the liquid feed ports,
feeding a $H_2$ rich quench liquid comprising:
$H_2$,
Propylene, and
the comonomer,
to the reactor through the second set of liquid feed ports, wherein the $H_2$ rich quench liquid comprises at least part of the first liquid stream
feeding a $H_2$ poor bottom gas comprising fresh propylene through the first set of gas feed ports,
feeding a $H_2$ rich bottom gas comprising:
$H_2$,
Propylene, and
The comonomer
through the second set of gas feed ports, wherein the $H_2$ rich bottom gas comprises at least part of the first gas stream, and
collecting the polymer particles formed in the agitated bed from the reactor,
wherein the said process comprises the further following steps:
fresh comonomer when it Is ethylene, is fed to:
the reactor as
a part of the $H_2$ poor bottom gas and/or
as part of the $H_2$ rich bottom gas
and/or fed to the separator
fresh comonomer chosen from a group comprising C4-C12 α-olefin, is fed:
to the reactor as:
a part of the $H_2$ poor quench liquid and/or
a part of the $H_2$ rich quench liquid
and/or to the separator.

According to the process of the invention, fresh comonomer may be fed to the reactor at different locations.

Thus, the comonomer concentration in the high molecular weight copolymer made in the $H_2$ poor zones and the low molecular weight copolymer made in the $H_2$ rich zones can advantageously be tuned according to desired needs requiring different properties.

The inventors have recognized that if the $H_2$-poor quench liquid fed to the first part of the reactor is made by stripping $H_2$ from the quench liquid fed to the later part of the reactor such as in the process of WO2011/155999, the stripping will also inevitably remove some part of the monomer.

In particular, the stripping process will remove a part of light molecular weight monomer, specially ethylene when it is used.

Consequently, the $H_2$-poor quench liquid will comprise a lower molecular weight monomer concentration than the $H_2$-rich quench liquid. This will create an uncontrolled gradient monomer concentration, in particular for light molecular weight monomer, in the reactor following the same trend with the $H_2$ concentration.

Instead of such uncontrolled gradient in comonomer concentration, the present invention allows to provide a controlled gradient in comonomer concentrations by identifying how the comonomer should be fed to the reactor.

According to an embodiment of the invention process, a $H_2$ poor quench liquid, a $H_2$ rich quench liquid, a $H_2$ poor bottom gas and a $H_2$ rich bottom gas are fed to the reactor through respective feed ports.

A catalyst system Is fed to the reactor through a port which may be one of the liquid feed ports for the quench liquid or a different port.

The polymer particles formed in the agitated bed are collected from the reactor and a reactor off-gas Is recovered from the reactor, to be processed to form part of the feeds to the reactor.

For the avoidance of discussion, the liquid feed ports are arranged next to each other on the top side of the reactor in a direction parallel to an elongated center line of the reactor.

Similarly, the gas feed ports are arranged next to each other on the bottom side of the reactor in a direction parallel to an elongated center line of the reactor.

Depending on a predefined configuration of the first set of liquid feed ports, the second set of liquid feed ports, the first set of gas feed ports and the second set of gas feed ports, the reactor may be provided with different reaction zones.

In some embodiments, the reactor is provided with two reaction zones that are arranged subsequent to each other in the downstream direction of the process, wherein:
  a first reaction zone of said two reaction zones which is fed with the $H_2$ poor quench liquid and the $H_2$ poor bottom gas, and
  a second reaction zone of said two reaction zones which is fed with the $H_2$ rich quench liquid and the $H_2$ rich bottom gas.

In some embodiments, the reactor is provided with three reaction zones that are arranged subsequent to each other in the downstream direction of the process, wherein:
  a first reaction zone of said three reaction zones which is fed with the $H_2$ poor quench liquid and the $H_2$ poor bottom gas,
  a second reaction zone of said three reaction zones which is fed with either 1) the $H_2$ poor quench liquid and the $H_2$ rich bottom gas or ii) the $H_2$ rich quench liquid and the $H_2$ poor bottom gas, and
  a third reaction zone of said three reaction zones which is fed with the $H_2$ rich quench liquid and the $H_2$ rich bottom gas.

In some embodiments, the reactor is provided with more than three reaction zones that are arranged subsequent to each other in the downstream direction of the process.

Independently of the number of reaction zones inside of the reactor, the reaction zones may have a similar volume or may have completely different volume.

Depending of the configuration, the size of the reactor zones may influence of the molecular weight distribution of the polymer obtain as in a larger zone, one or more monomer(s) or $H_2$ can be added in higher concentration than the other to obtain a particular profile.

In some embodiment, the reactor off-gas is fed to a condenser to be partly condensed and form a gas-liquid mixture.

The gas-liquid mixture is fed to a separator to obtain a first gas stream and a first liquid stream.

In some embodiment, fresh propylene may be fed to the separator and/or added to the first liquid stream. Fresh comonomer may be fed to the separator and/or added to the first gas stream and/or added to the first liquid stream.

In some embodiments, at least part of the first gas stream is fed to the reactor as (part of) the $H_2$ rich bottom gas, typically after being mixed with additional $H_2$.

In some embodiments, at least part of the first liquid stream is fed to the reactor as (part of) the $H_2$ rich quench liquid.

In some embodiments, part of the first liquid stream is fed to a $H_2$ stripper to remove $H_2$ (as a result of which some comonomer chosen from a group comprising ethylene, C4-C12 α-olefin will also be removed, in particular ethylene when it is used) to form a second liquid stream comprising propylene and a part of the comonomer.

The second liquid stream may be fed to the reactor as (part of) the $H_2$ poor quench liquid. Alternatively or additionally, the second liquid stream may be fed as (part of) the $H_2$ poor bottom gas after being vaporized.

Fresh comonomer may be fed to the reactor by feeding the fresh comonomer directly to the reactor as a part of the $H_2$ poor bottom gas.

Alternatively or additionally, fresh comonomer may be fed to the separator. In the latter case, the $H_2$ rich bottom gas may comprise a portion of this comonomer.

When all of the fresh comonomer is fed to the separator or added to the first gas stream, the upstream portion of the reactor receives only a small concentration of comonomer. Except for the comonomer received by back-mixing, the upstream portion of the reactor receives comonomer only when the second liquid stream is made by a $H_2$ stripper and fed as part of the $H_2$ poor quench liquid. In this case, the concentration of comonomer will Increase sharply from the upstream portion to the downstream portion of the reactor. When all of the comonomer Is fed directly to the reactor as a part of the $H_2$ poor bottom gas, the downstream portion of the reactor receives comonomer only from the reactor off-gas. In this case, the comonomer concentration in the upstream portion with respect to that in the downstream portion will be higher than in the former case (where comonomer is fed to the separator or added to the first gas stream), provided that the other process parameters are the same.

Typically, the concentration comonomer will increase from the upstream portion to the downstream portion of the reactor, but the increase will not be sharp.

Therefore, the effect of comonomer distribution in the reactor will lead to different amount of this comonomer incorporated in the high and low molecular weight parts of the polymer.

It is preferable that a part of the fresh comonomer is fed directly to the reactor as a part of the $H_2$ poor bottom gas, and a part of the fresh comonomer is fed to the separator or added to the first gas stream, when the comonomer is ethylene.

Accordingly, it is advantageously possible to tune the gradient of the concentration of comonomer over the reactor, and thus the comonomer concentrations in the copolymers produced.

The tuning can be done by choosing the ratio between fresh comonomer fed as part of the $H_2$ poor bottom gas (directly fed to the upstream portion of the reactor) and fresh comonomer fed as part of the $H_2$ rich bottom gas (fed to the separator or added to the first gas stream).

When a larger amount of fresh comonomer is directly fed to upstream portion of the reactor, the amount of comonomer in the high molecular weight copolymer produced in the $H_2$ poor zone will be higher.

Fresh comonomer may be fed to the reactor by feeding the fresh comonomer to the reactor as a part of the $H_2$ poor quench liquid. This can be done by feeding fresh comonomer directly to the reactor.

This can also be done by feeding comonomer to either the $H_2$ stripper or the bottom liquid stream leaving the $H_2$ stripper (the second liquid stream) in embodiments where the $H_2$ stripper is used.

Alternatively or additionally, fresh comonomer may be fed to the separator or added to the first liquid stream. In these cases, the $H_2$ rich quench liquid comprises comonomer fed to the separator. Further, the fresh comonomer may be comprised in the $H_2$ poor quench liquid as part of the second liquid stream formed by the stripper from the first liquid stream.

When all of the fresh comonomer is fed to the reactor as part of the $H_2$ poor quench liquid, the downstream portion of the reactor receives comonomer only from the reactor off-gas. The concentration of the comonomer will then generally decrease from the upstream portion to the downstream portion of the reactor.

When all of the fresh comonomer is fed to the separator or added to the first liquid stream, the upstream portion of the reactor receives comonomer only as part of the second liquid stream made by stripping $H_2$ from the first liquid stream. The concentration of the comonomer will generally increase from the upstream portion to the downstream portion of the reactor.

It is preferable that part of the fresh comonomer fed to the reactor as a part of the $H_2$ poor quench liquid, and part of the fresh comonomer is fed to the separator or added to the first liquid stream, when the comonomer is chosen from a group comprising C4 to C12 α-olefin.

Accordingly, it is advantageously possible to tune the gradient of the concentration of the monomer over the reaction zones of the reactor.

The tuning can be done by choosing the ratio between fresh comonomer fed to the reactor as part of the $H_2$ poor quench liquid and fresh comonomer fed to the separator or added to the first liquid/gas stream.

Further, the concentration of comonomer in the upstream portion of the reactor may be decreased (increased) by feeding more (less) amount of fresh propylene as part of the $H_2$ poor quench liquid with respect to the amount of fresh propylene fed as part of the $H_2$ rich quench liquid.

Thus, according to the process of the invention, the comonomer concentration in the low molecular weight copolymer and the high molecular weight copolymer can advantageously be tuned according to desired needs.

In some embodiment, the reactor off-gas Is fed to a cyclone from which polymer particles are carried back to the reactor.

Depending of the position of reentry of the polymer particles Inside the reactor, different stream will be used:
A reentry inside the first reaction zone of the reactor will be by means of the $H_2$ poor gas stream;
A reentry inside the last reaction zone of the reactor will be by means of the $H_2$ rich gas stream.

In the process of the Invention, a catalyst system is added to the reactor for polymerizing propylene, and a comonomer chosen from a group comprising ethylene and the C4-C12 α-olefin.

The catalyst system is typically added through a liquid feed ports.

The catalyst system may be a metallocene based catalyst system.

In a preferred but non-limiting embodiment, the catalyst system may be a Ziegler-Natta catalyst system.

In some embodiments, suitable catalyst system, such as a high activity Ziegler-Natta catalyst system comprising a solid, titanium-containing component in combination with at least one aluminum alkyl cocatalyst, and preferably an external donor, is used.

Examples of the suitable catalyst systems are described in WO2011/155999, on page 7, line 16 to page 10, line 6; and page 10, line 31 to page 13, line 14 incorporated herein by reference.

Further examples of the suitable catalyst systems are described in WO2018059955.

For example, Ziegler-Natta catalyst system comprises
a procatalyst,
a co-catalyst and
optionally an external electron donor,
wherein the procatalyst id obtained by a process comprising the steps of:
A. Step A) providing or preparing a compound $R^4_z MgX^4_{2-z}$ wherein
$R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms;
$X^4$ is independently selected from the group consisting of fluoride (F—), chloride (Cl—), bromide (Br—) or iodide (I—), preferably chloride;
z is in a range of larger than 0 and smaller than 2, being $0<z<2$;
B. Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein
$R^1$, $R^5$ and $R^6$ are each Independently selected from linear, branched or cyclic hydrocarbyl group Independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
$X^1$ is independently selected from the group consisting of fluoride (F—), chloride (Cl—), bromide (Br—) or Iodide (I—), preferably chloride;
n is in range of 0 to 4, preferably n Is from 0 up to and Including 1;
z is in a range of larger than 0 and smaller than 2, being $0<z<2$;
x is in a range of larger than 0 and smaller than 2, being $0<x<2$;
C. Step C) activating said solid support, comprising two sub steps:
Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Ai or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and a second activating compound being an activating electron donor; and Step C2) a second activation step by contacting the activated solid support obtained in step C1) with an activating electron donor; to obtain a second intermediate reaction product;

D. Step D) reacting the second intermediate reaction product obtained step C2) with a halogen-containing Ti-compound, optionally an activator prior to or simultaneous with the addition of an internal donor, and at least one internal electron donor to obtain said procatalyst.

The further preferred examples of the procatalyst are mentioned in the claims of WO2018059955, incorporated by reference.

Particularly preferred procatalyst is catalyst H used in Example 8 of WO2018059955.

These catalyst systems of WO2018059955 are phthalate-free. This has the advantage that undesired phthalates will not end up in the drinking water transported by a pipe made by the composition according to the invention. Therefore, preferably, the composition of the Invention as well as any articles comprising such composition, such as the pipes of the Invention, are essentially phthalate-free. For purposes of the Invention, essentially phthalate-free Is defined as the presence of less than 0.0001 wt % of phthalates based on the composition, preferably 0.00000 wt % of phthalates based on the composition.

Preferably, one or both (preferably both) of the first copolymer fraction and the second copolymer fraction are prepared using the Ziegler-Natta catalyst system according to the catalyst system of claim 12 of WO2018059955.

The amounts of $H_2$ fed to the reactor may be selected according to known criteria such that desired molecular weights of the respective fractions are obtained.

The amounts of comonomer chosen from a group comprising ethylene and the C4-C12 α-olefin with respect to the amount of propylene to be fed to the reactor may be selected such that desired amounts of comonomer chosen from a group comprising ethylene and the C4-C12 α-olefin in the respective polymer fractions are obtained.

Conditions for the polymerization, such as temperature and time, pressures of the monomer, avoidance of contamination of catalyst and the use of additives to molecular weights are known to the skilled person. The temperature should be selected to ensure reasonable copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin copolymerization according to this Invention is carried out at monomer pressures of about atmospheric or above. Generally, monomer pressures range from about 1.2 to about 40 bar (120 to 4000 kPa), more typically 18 to 26 bar.

The copolymerization time will generally range from about ½ to several hours in batch processes with corresponding average residence times in continuous processes. Prepolymerization or encapsulation of the catalyst or catalyst component of this Invention also may be carried out prior to being used in the polymerization or copolymerization of alpha olefins. A particularly useful prepolymerization procedure is described in U.S. Pat. No. 4,579,836, which is incorporated herein by reference.

After polymerization, polymer powder is removed from the polymerization reactor by methods known to the art, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processed by the extruder, polymer powder may be contacted with air or water vapor to deactivate any remaining catalytic species.

To realize the process according to the invention the setup assembly comprising at least:
  a horizontal stirred reactor
  a recycle loop and
  optionally comprise a stripper loop.

The horizontal stirred reactor comprises at least:
  an agitated bed for forming polymer particles with at least two reaction zones or more,
  a plurality of liquid feed ports that are subsequently arranged along a top side of the reactor above the agitated bed,
  a plurality of gas feed ports that are subsequently arranged along a bottom side of the reactor below the agitated bed,
  a plurality of off-gas ports (116) arranged along a top side of the reactor above the agitated bed in a downstream direction of the process.
  a plurality of catalyst feed system ports arranged on the top side of the reactor.

Each plurality liquid feed and gas feed ports are subdivided in group and arranged subsequently to one group after another in order that each group can be in different reaction zones in a downstream direction of the process.

The recycle loop comprising at least:
  a condenser connected to the horizontal stirred reactor by the plurality of off-gas ports, and
  a separator connected to the condenser by a gas liquid mixture line and to the horizontal stirred reactor by
    a liquid stream line to liquid feed ports, and
    a gas stream line to gas feed ports.

Optionally, the setup assembly can also comprise a stripper loop, which include at least a stripper column configured to remove at least $H_2$ from a liquid stream. The stripper column is connected to the separator through the liquid stream line, and deliver to the liquid feed ports of horizontal stirred reactor, through a poor $H_2$ line, a $H_2$ poor quench liquid, and send to the condenser through a rich $H_2$ line, the removed $H_2$.

In another embodiment, a part of the poor $H_2$ line stream can be vaporize in order to be delivered to the gas feed ports as a part of the $H_2$ poor quench gas.

Due to the specification of this setup assembly and its capacity to send in a controlled manner, $H_2$ poor quench liquid, $H_2$ poor bottom gas, $H_2$ rich quench liquid and $H_2$ rich bottom gas with their own specific monomer concentrations, in different reaction zones; it allows the operator to create inside of the reactor, different concentration gradients of monomer and $H_2$ in the different reaction zones.

These gradients allow the production of different profile of copolymer composition with various weight distribution and monomer incorporation.

In a general manner:

when the fresh monomer is add only to the $H_2$ poor quench liquid and/or $H_2$ poor bottom gas, the monomer concentration will be higher in the first reaction zone and will decrease in the reaction zones in a downstream direction of the process;

when the fresh monomer is add only to $H_2$ rich quench liquid and/or $H_2$ rich bottom gas only through the separator or a line exiting the separator, the monomer concentration will be lower in the first reaction zone and will increase in the reaction zones in a downstream direction of the process;

when the fresh monomer is add to $H_2$ poor quench liquid, $H_2$ poor bottom gas, $H_2$ rich quench liquid and $H_2$ rich bottom gas the monomer concentration will be flat through the entire horizontal stirred reactor.

When a stripper loop is implemented, the concentration of monomer added in the separator or a line exiting the separator, is generally smoother through the entire reactor, as a part of the poor quench liquid/gas will contain some of the monomer.

By tuning the efficiency of the stripper loop and the addition of fresh $H_2$, the operator can create a gradient of $H_2$ through the entire horizontal stirred reactor which allows to modify the molecular weight distribution of the produced copolymer:

higher $H_2$ concentration in the first reaction zone will create low molecular weight copolymer, higher $H_2$ concentration in the reaction zone in a downstream direction of the process, will create higher molecular weight copolymer.

Since the reactor product is a blend of both fraction, it will exhibit a broadened molecular weight distribution.

In addition, the repartition of the first liquid stream coming from the separator, into $H_2$ rich quench liquid and the $H_2$ stripper by line, can also depend of the operation parameters which will also influence the gradient of the comonomer. For example, such repartition can be done with a control valve, which redirected the stream between 0 to 100% in direction of the $H_2$ stripper by line or in direction of the $H_2$ rich quench liquid.

It is noted that the invention relates to all possible combinations of features described herein, preferred in particular are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous as it offers a simpler, more economical process for the preparation of the product/composition. Similarly, it is also to be understood that a description on a process comprising certain steps also discloses a process consisting of these steps. The process consisting of these steps may be advantageous as it offers a simpler, more economical process.

When values are mentioned for a lower limit and an upper limit for a parameter, ranges made by the combinations of the values of the lower limit and the values of the upper limit are also understood to be disclosed.

BRIEF DESCRIPTION OF THE FIGURES

The invention is now elucidated referring to the drawings in which.

EXAMPLES

The following examples are performed under the same conditions and parameters, in order that the only variable is the locations where comonomer is to be fed in the system and it nature.

For the non-limiting example 1a to 10a, the comonomer is ethylene and for the non-limiting example 1b to 10b, the comonomer is 1-hexene.

Example 1a

Figure 1A:
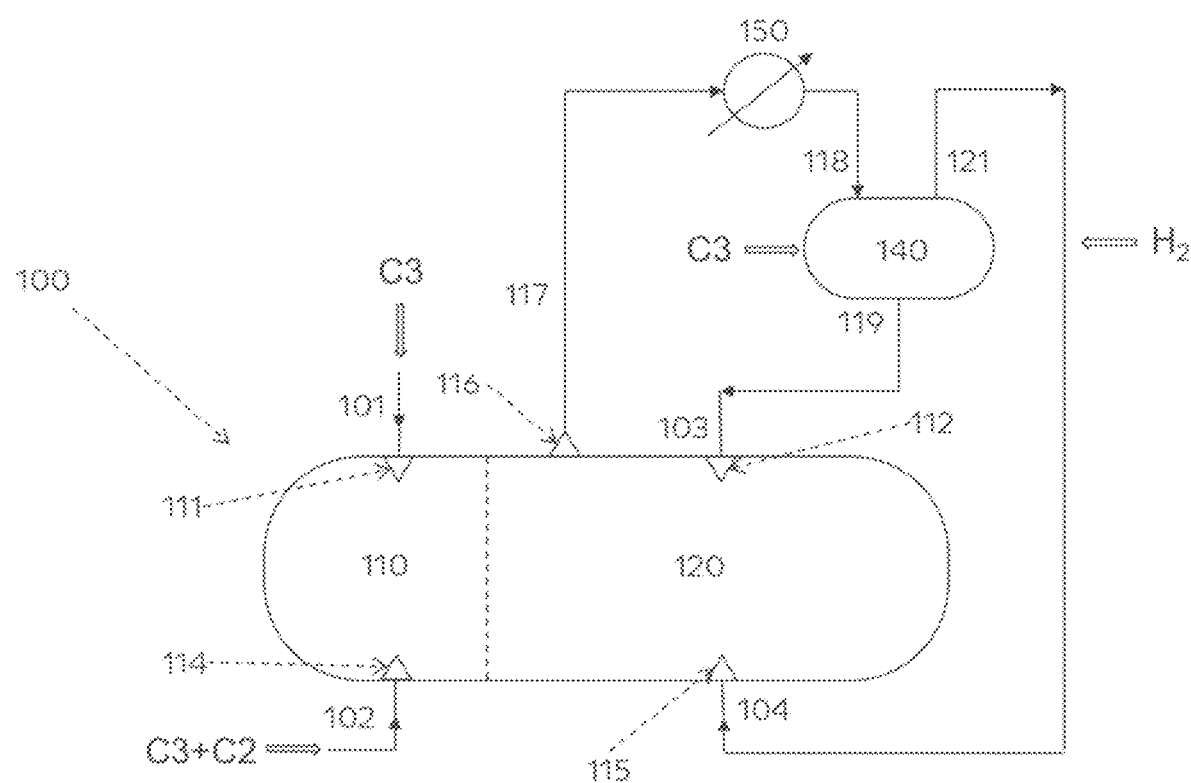
FIGS. 1a to 4b show a schematic representation of examples of a system for carrying out the process of the invention comprising a reactor with two reaction zones.

FIG. 1a shows a schematic representation of a non-limiting example of a system for carrying out the process of the invention, in which a reactor 100 consisting of a first reaction zone 110 and a second reaction zone 120.

In this embodiment, the comonomer chosen from a group comprising ethylene and C4-C12 α-olefin is ethylene.

Fresh ethylene is fed to the reactor by feeding the fresh ethylene directly to the reactor as a part of the $H_2$ poor bottom gas 102.

The reactor off gas 117 is condensed by a condenser 150 to provide a gas-liquid mixture 118, whish fed a separator 140 where fresh propylene is added.

The separator 140 allows a separation of the gas-liquid mixture 118 into a first liquid stream 119 and a first gas stream 121.

The first gas stream 121 is mixed with additional $H_2$ and the obtained $H_2$ rich bottom gas 104 is fed to the second reaction zone 120.

Thus, in this embodiment, the first reaction zone 110 is fed with the $H_2$ poor quench liquid 101 and the $H_2$ poor bottom gas 102.

The copolymer prepared in this first reaction zone 110 has a high molecular weight.

The second reaction zone 120 is fed with the H$_2$ rich quench liquid 103 and the H$_2$ rich bottom gas 104.

The copolymer prepared in this second reaction zone 120 has a low molecular weight.

The ethylene concentration would be relatively flat over the reactor as a part of ethylene present in the reactor off gas 117 will be send by the separator 140 in the first gas stream 121 due to this low molecular weight.

Example 1b

Figure 1B:
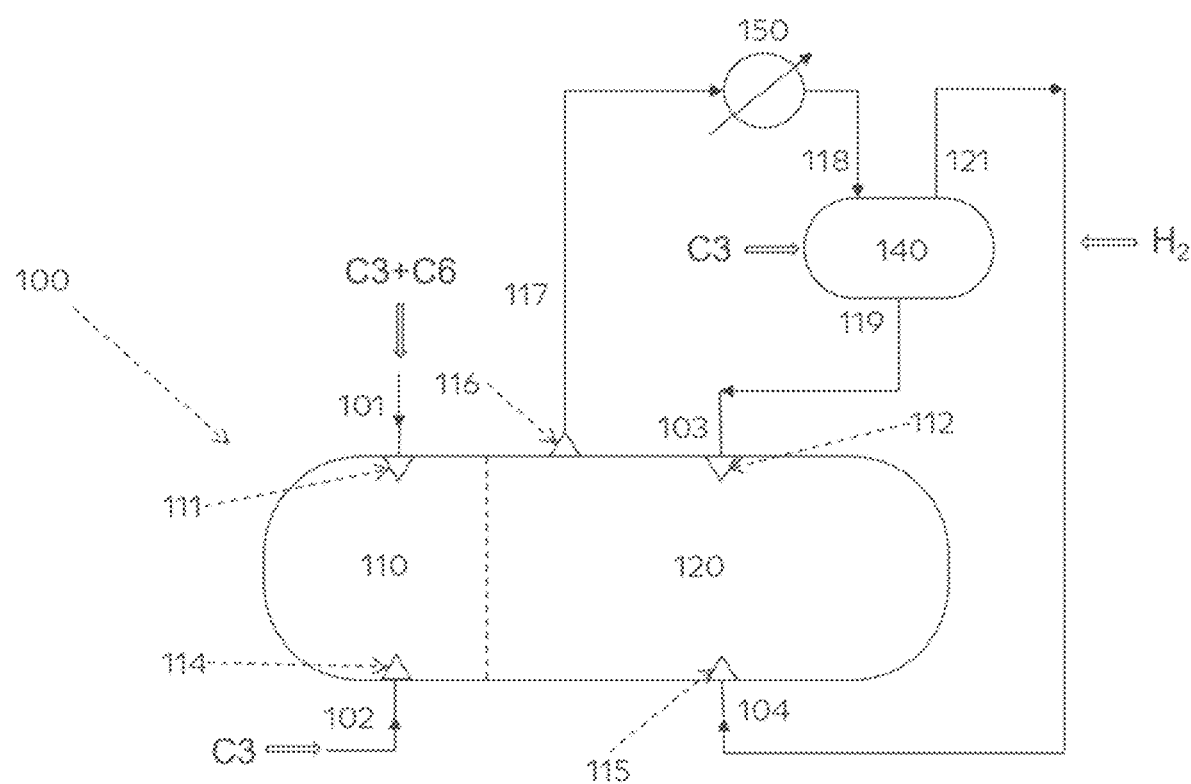

FIG. 1b shows a similar setup that the FIG. 1a In which the comonomer chosen from a group comprising ethylene and C4-C12 α-olefin is 1-hexene.

The 1-hexene concentration would be decreasing over the reactor as 1-hexene is only fed as part of the H$_2$ poor bottom liquid 101.

Example 2a and 2b

Figure 2A:
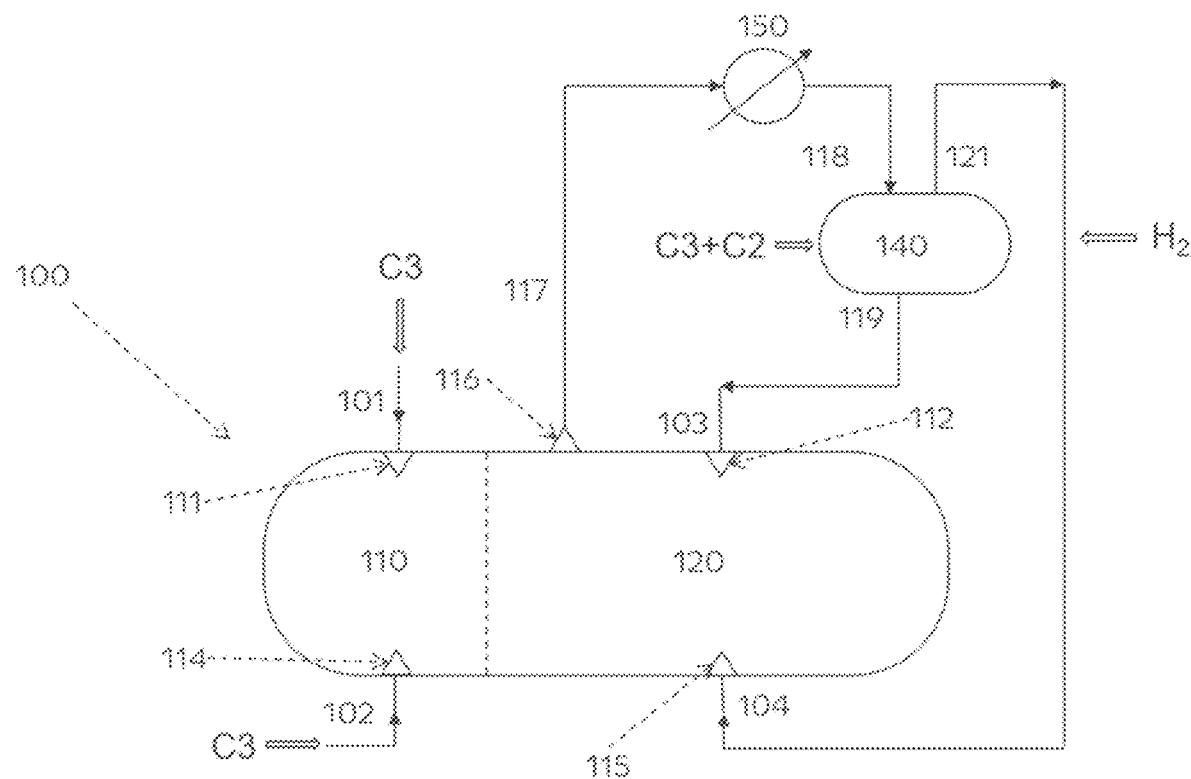
Figure 2B:
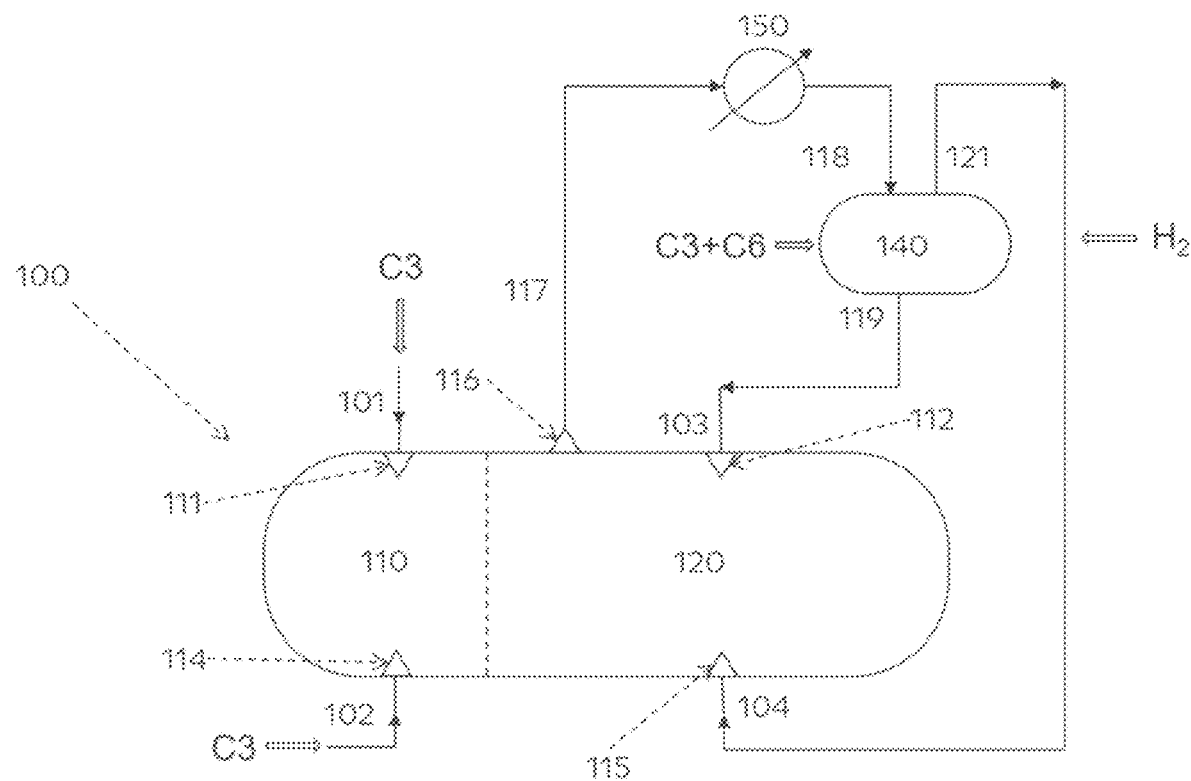

In another non-limitative embodiment shown by FIGS. 2a and 2b, fresh comonomer could be add in the system through the separator 140.

Due to the low molecular weight of ethylene, the separator will send most part of it in the first gas stream 121, conversely, a C4-C12 α-olefin will be send to first liquid stream 119.

In FIG. 2a configuration, ethylene concentrations would be relatively higher in low molecular weight distribution part.

In FIG. 2b configuration, 1-hexene concentrations would be relatively higher in low molecular weight distribution part.

Example 3a and 3b

Figure 3A:
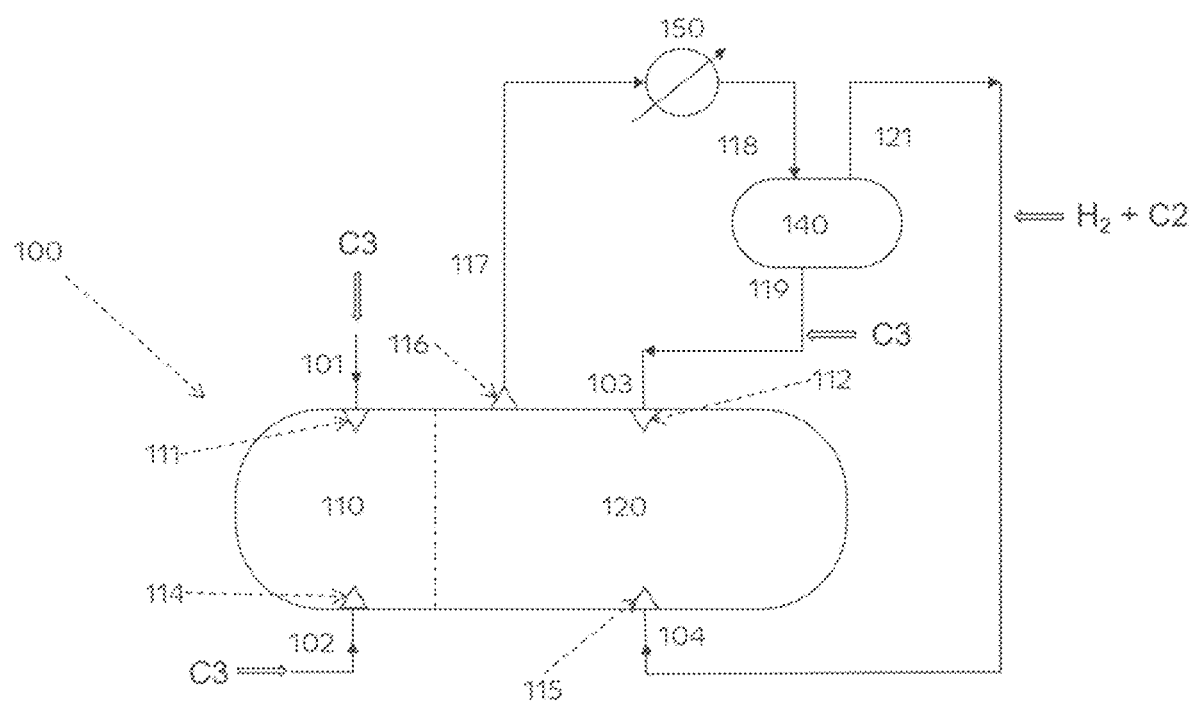
Figure 3B:
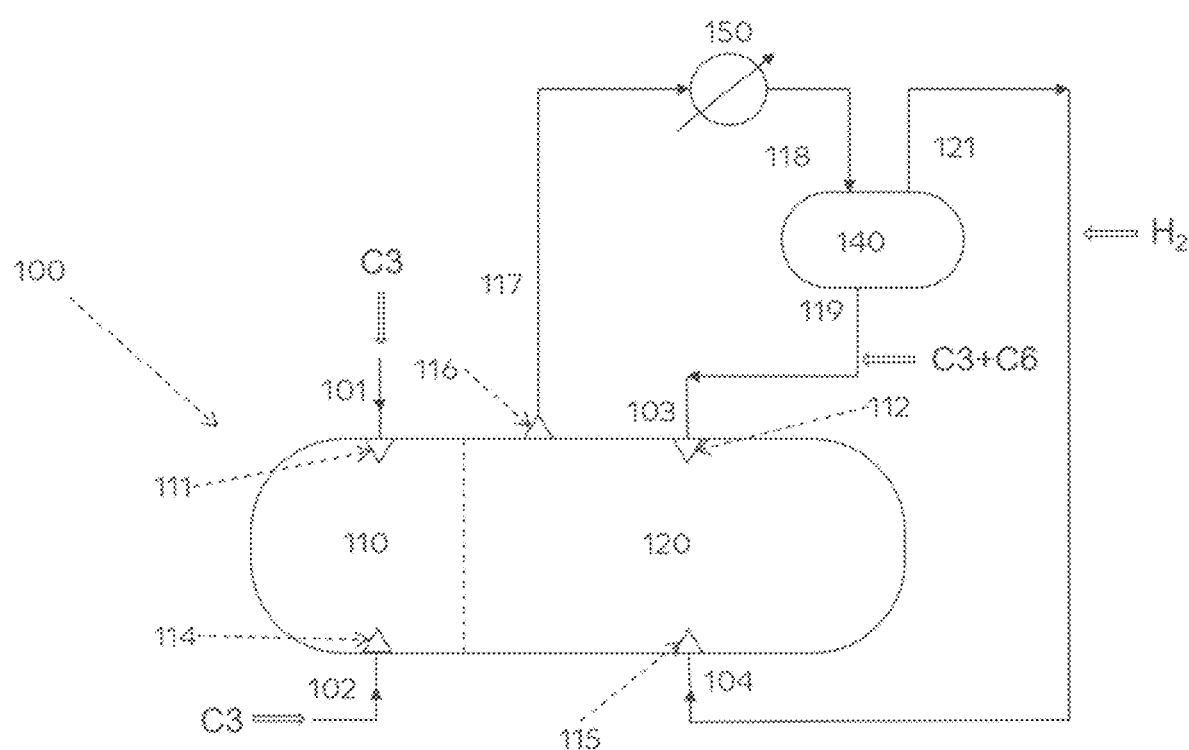

In another non-limitative embodiment shown by FIGS. 3a and 3b, fresh comonomer could be add in the system after the separator 140, in the first gas stream 121 when the comonomer is ethylene, in the first liquid stream 119 when the comonomer is a C4-C12 α-olefin.

The profile of the copolymer obtain by this process will look like to the one obtain when comonomer is added in the system through the separator 140.

In FIG. 3a configuration, ethylene concentrations would be relatively higher in low molecular weight distribution part.

In FIG. 3b configuration, 1-hexene concentrations would be relatively higher in low molecular weight distribution part.

Example 4a and 4b

Figure 4A:
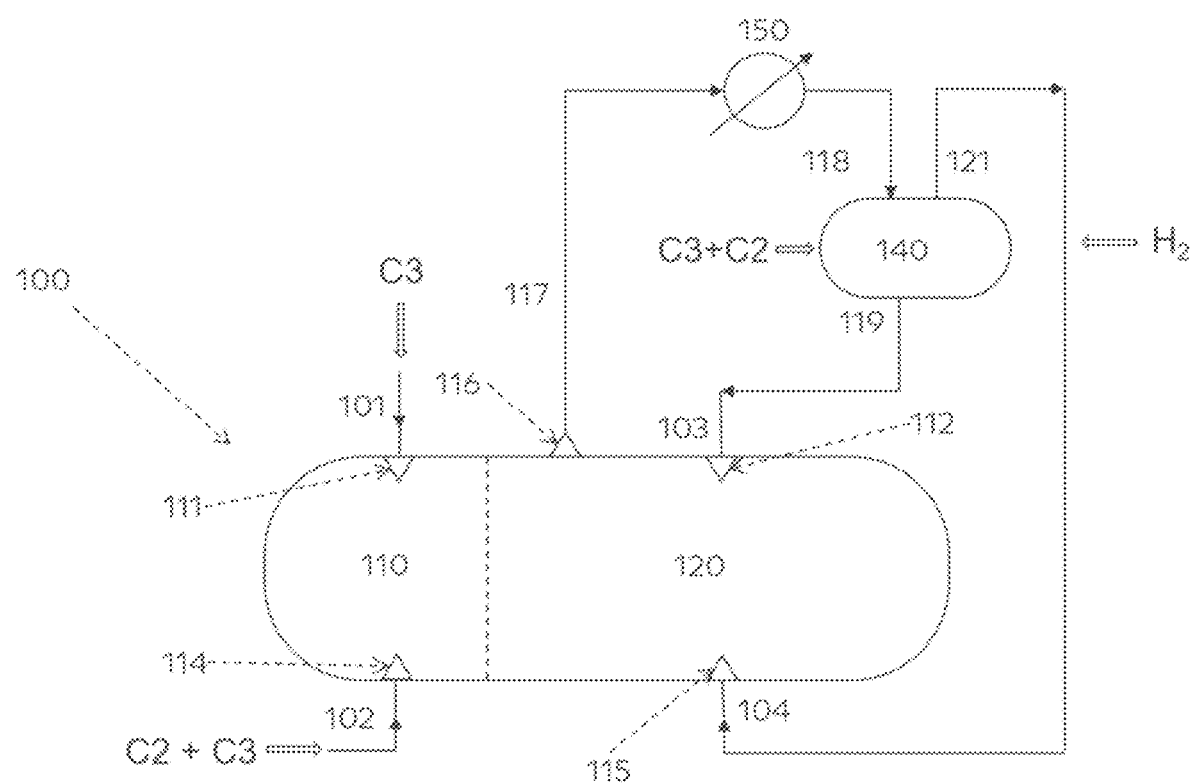
Figure 4B:
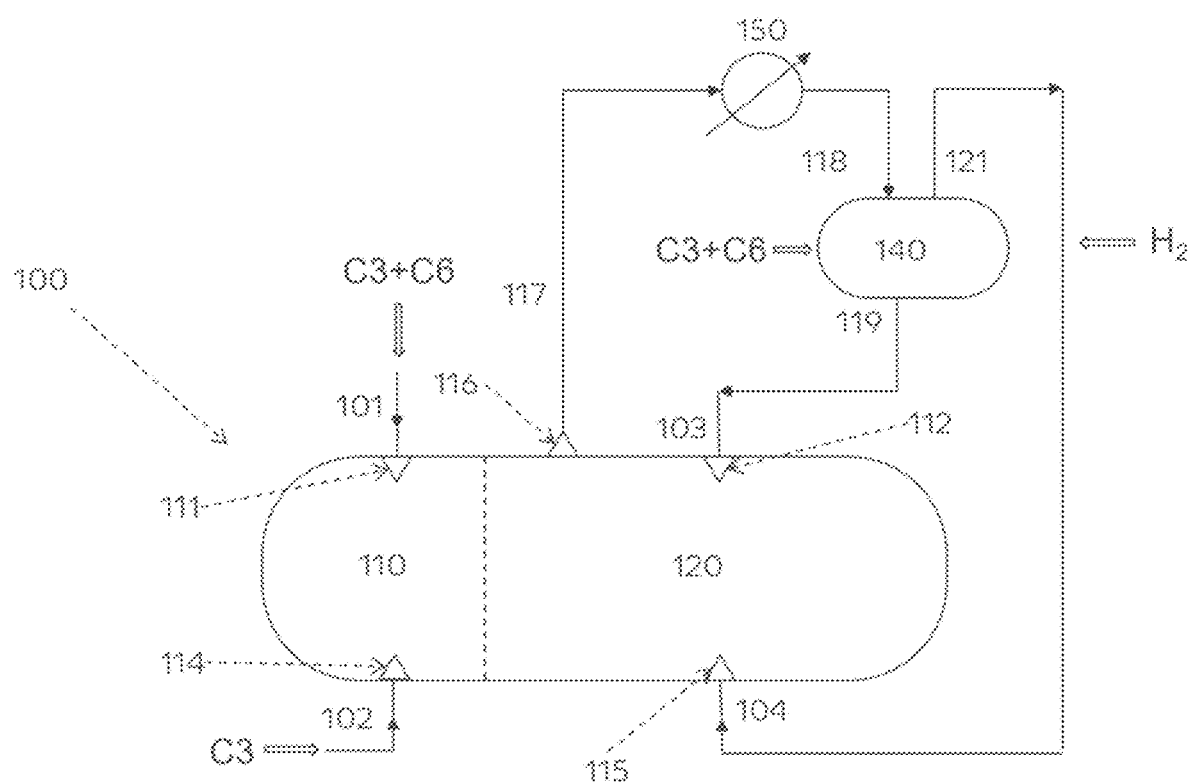

In another non-limitative embodiment shown by FIGS. 4a and 4b, which is the combination of the embodiments shown in FIGS. 1 and 2.

The split feed of the fresh 1-hexene or ethylene allows to give a flat profile of 1-hexene concentration in the weight distribution and an intermediate profile for ethylene than the one obtain in the embodiments described by FIGS. 1 and 2.

Example 5a and 5b

Figure 5A:
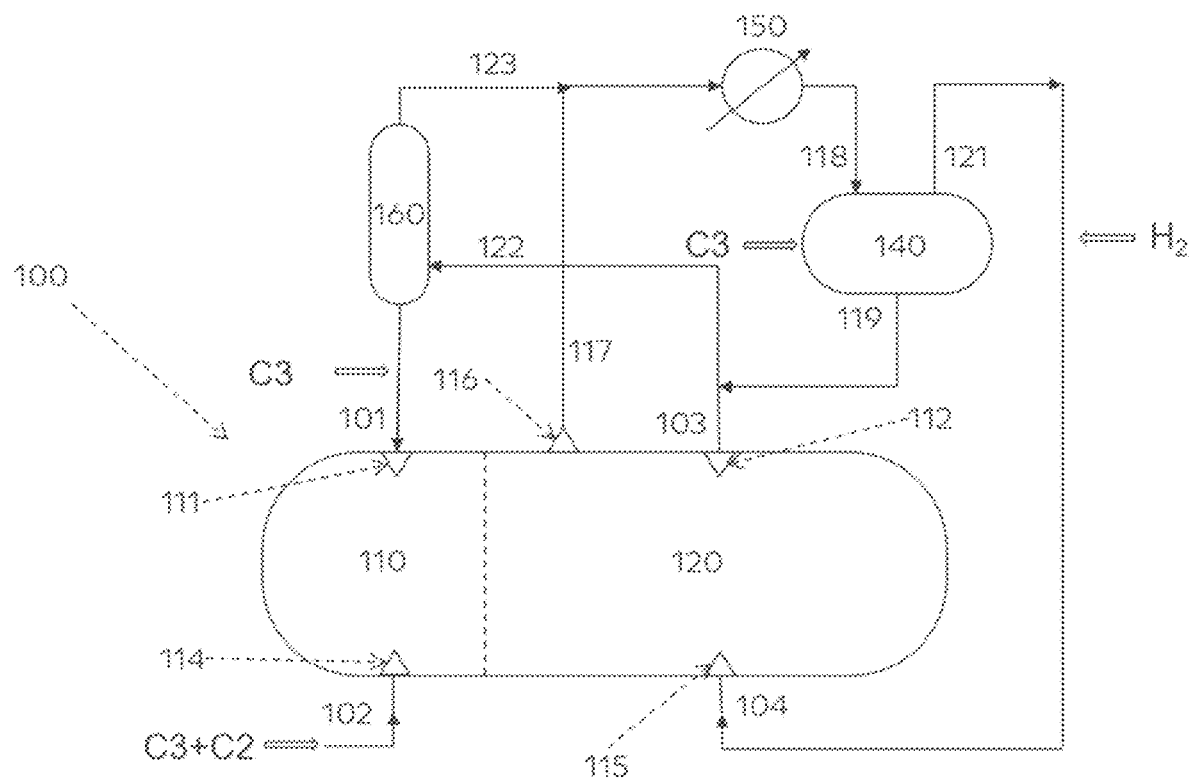
FIGS. 5a to 6b show a schematic representation of further examples of a system for carrying out the process of the invention comprising a reactor with two reaction zones and a stripper column.
Figure 5B:
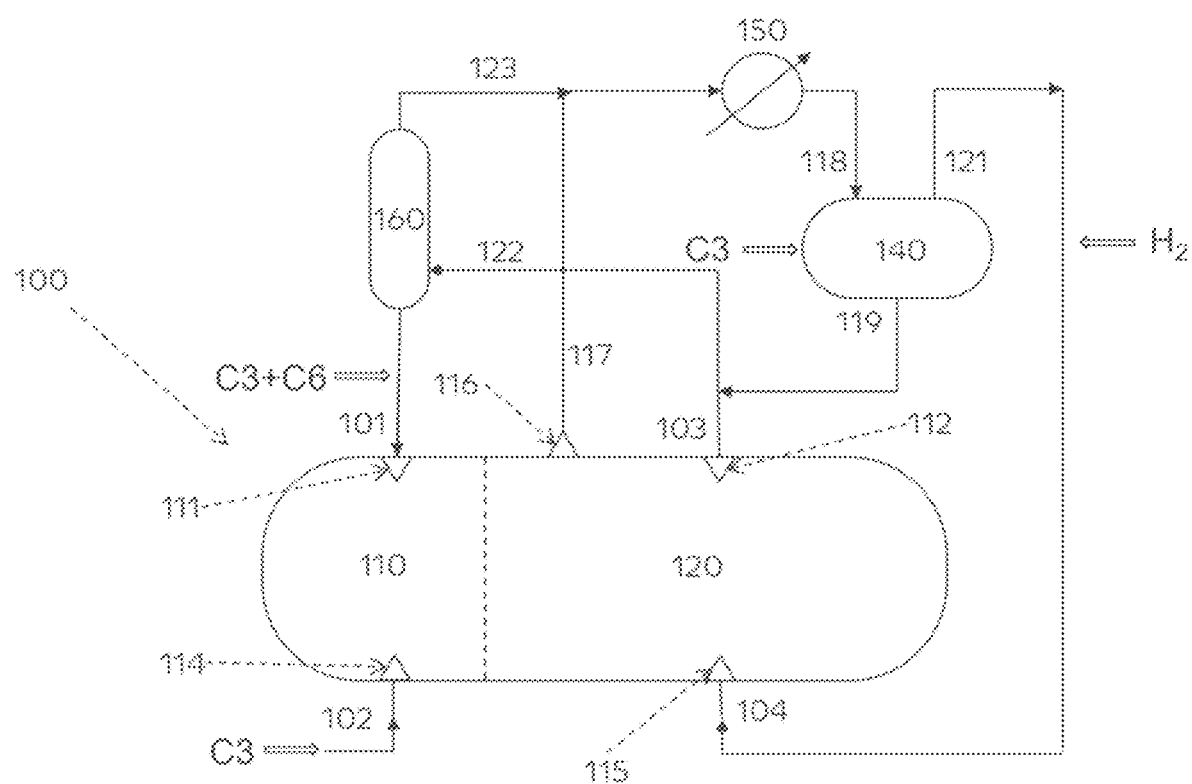

In another non-limitative embodiment shown by FIGS. 5a and 5b, a schematic representation of a non-limiting example of a system for carrying out the process of the invention, similar to the one describe in FIGS. 1a and 1b, and comprising an additional stripper column 160 configured to remove at least H$_2$ and connected:

to the separator 140 through a liquid stream line 122 comprising a part of the first liquid stream line 119, to the first set of the liquid feed ports 111 of horizontal stirred reactor 100 through a poor H$_2$ liquid stream line which is configured to carry on a H$_2$ poor quench liquid produce by the stripper, and to the condenser 150 through a rich H$_2$ stream line 123.

In this configuration, the stripper allows for high H$_2$ lean quench availability.

However, in the embodiment describe by FIG. 5a, a significate amount of ethylene due to its low molecular weight will be remove by the stripper into the rich H$_2$ streamline 123, and will continue its pass to the separator, which will send most part of it in the first gas stream 121. Therefor the ethylene concentration should be relatively flat.

Regarding FIG. 5b, the stripper will reintroduce already present 1-hexene as a part of the H$_2$ poor bottom liquid 101. Therefor the 1-hexene concentration will be higher in the first part of the reactor and decreasing toward the end of the reactor.

In each embodiment, depending of the operation parameter, a valve will control the repartition of the first liquid stream line 119 between line 122 and 103. Therefore, it will influence the gradient of the comonomer.

Example 6a and 6b

Figure 6A:
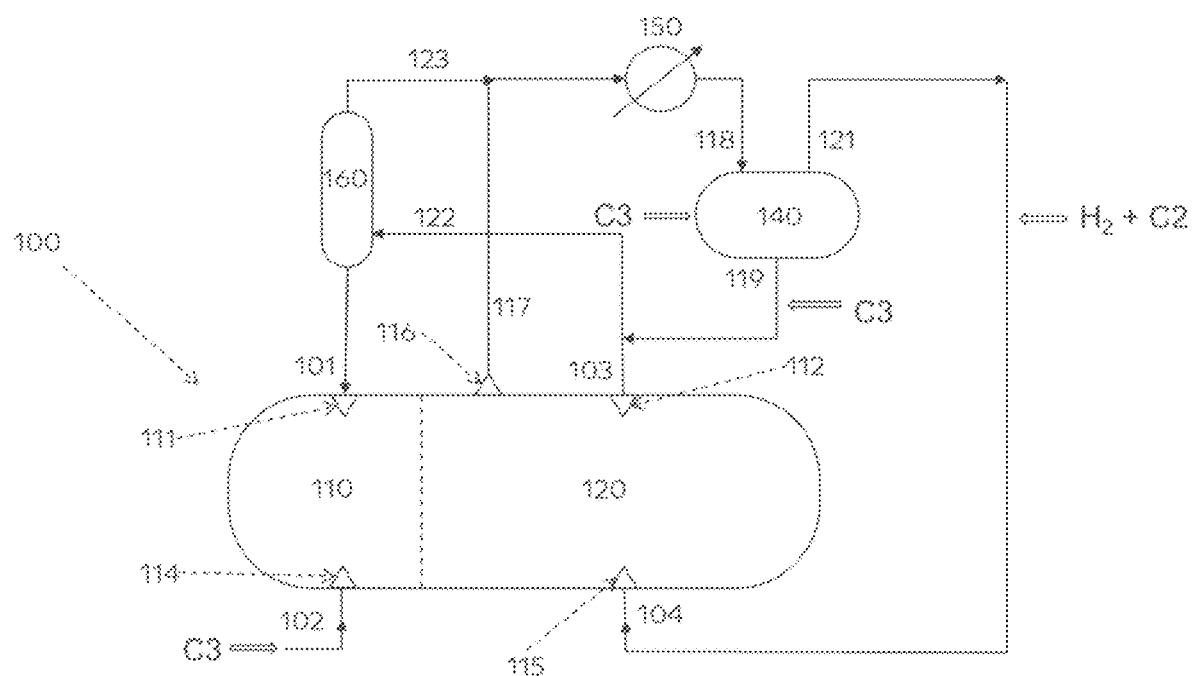
Figure 6B:
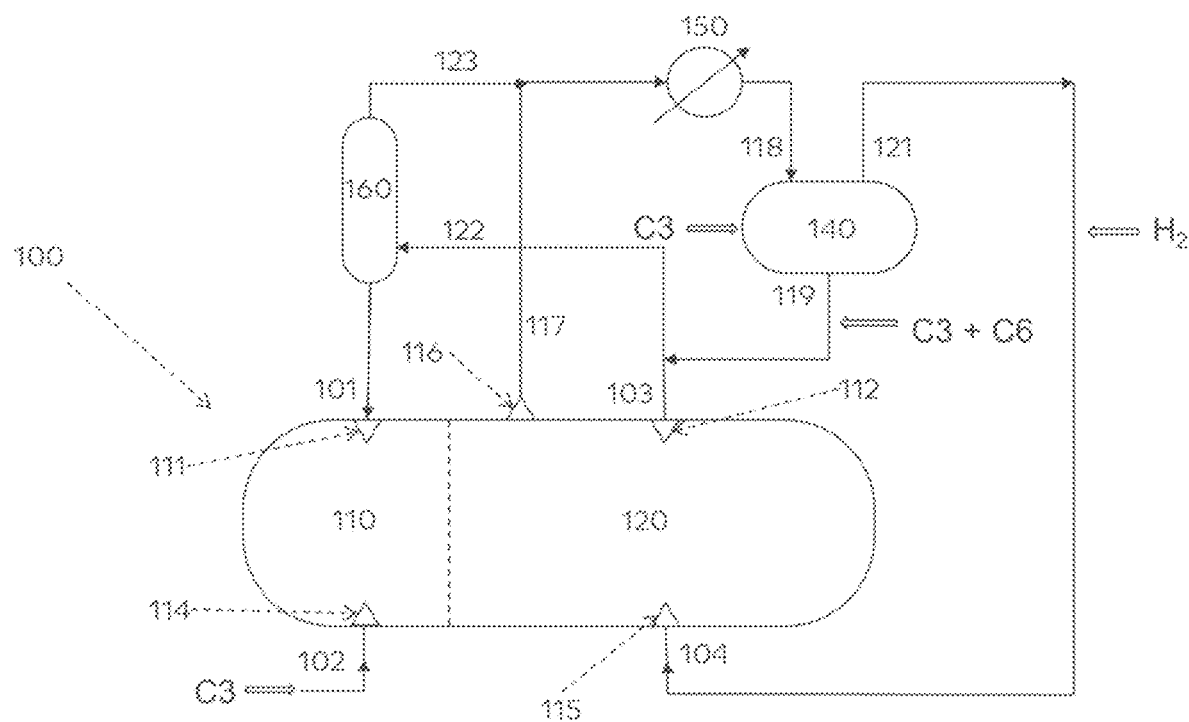

In another non-limitative embodiment shown by FIGS. 6a and 6b comprising a setup Identical to the one in FIGS. 5a and 5b, fresh comonomer are added in the system after the separator 140, in the first gas stream 121 when the comonomer is ethylene (FIG. 6a), in the first liquid stream 119 when the comonomer Is a C4-C12 α-olefin (FIG. 6b).

The profile of the copolymer obtain by this process will look like to the one obtain when comonomer is added in the system through the separator 140.

In FIG. 6a configuration, ethylene concentrations would be relatively higher in low molecular weight distribution part 120 and increasing toward the end of the reactor.

In FIG. 6b configuration, 1-hexene concentrations would be relatively flat in the reactor. However, the repartition of the first liquid stream line 119 between lines 122 and 103 will be able to control the concentration gradient. The concentration will be higher in the first zone of the majority of the stream is redirected trough the stripper, and will be lower if the majority of the stream is redirected trough the H$_2$ rich quench liquid 103.

Example 7a to 10b

In other non-limitative embodiments shown by FIG. 7a to 10b, the system for carrying out the process of the invention comprise a reactor 100 consisting of a first reaction zone 110, a second reaction zone 120 and a third reaction zone 130 arranged subsequent to each other in the downstream direction of the process, wherein a first reaction zone of said three reaction zones is fed with the H$_2$ poor quench liquid and the H$_2$ poor bottom gas, a second reaction zone of said three reaction zones is fed with either i) the H$_2$ poor quench liquid and the H$_2$ rich bottom gas as show in the figure, or ii) the H$_2$ rich quench liquid and the H$_2$ poor bottom gas (embodiments not illustrated by the said example), and a third reaction zone of said three reaction zones is fed with the H$_2$ rich quench liquid and the H$_2$ rich bottom gas.

The rest of the setup is similar to the one illustrated in FIG. 5a to 5b.

A reactor off-gas 117 comprising H$_2$, propylene and the comonomer is recovered from the reactor through a set of off-gas ports 116.

The reactor off-gas 117 is condensed by a condenser 150 to provide a gas-liquid mixture 118, which is fed to a separator 140.

The separator 140 can be also fed with fresh propylene.

The separator 140 provides a first liquid stream 119 comprising essentially propylene and the commoner as well as H$_2$ dissolved in the liquid mixture of propylene and a first gas stream 121 comprising essentially H$_2$, propylene and ethylene when it is used.

The first gas stream 121 is mixed with additional H$_2$ and the obtained H$_2$ rich bottom gas 104 is fed to the third reaction zone 130.

The first liquid stream 119 is fed to the second reaction zone 120 and the third reaction zone 130 through the second set of liquid port 112, as the H$_2$ rich quench liquids 103.

Thus, in this embodiment, the first reaction zone 110 is fed with the H$_2$ poor quench liquid 101 and the H$_2$ poor bottom gas 102. The copolymer prepared in this first reaction zone 110 has a high molecular weight.

The third reaction zone 130 is fed with the H$_2$ rich quench liquid 103 and the H$_2$ rich bottom gas 104. The copolymer prepared in this first reaction zone 110 has a low molecular weight.

The second reaction zone 120 is fed with the H$_2$ rich quench liquid 103 and the H$_2$ poor bottom gas 102. The copolymer prepared in this second reaction zone 120 has a molecular weight between those made in the first and the third reaction zones 110, 130.

Figure 7A:
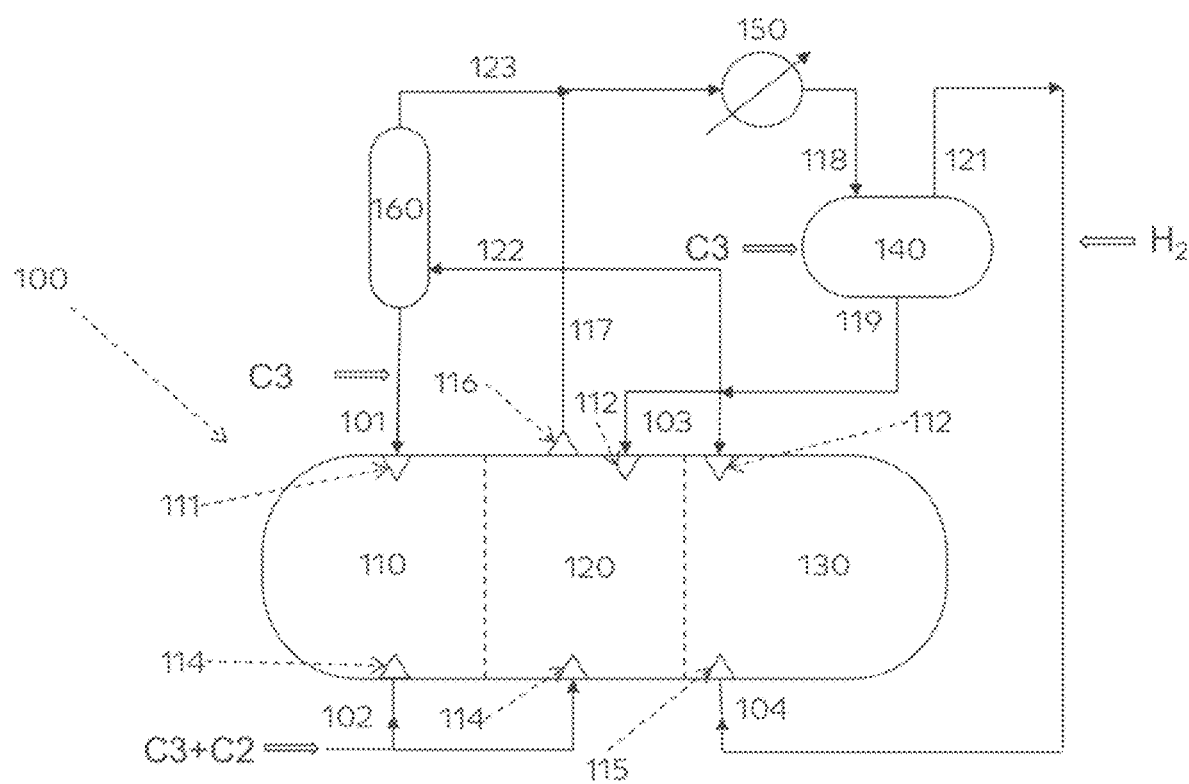
FIGS. 7a to 10b show a schematic representation of further examples of a system for carrying out the process of the invention comprising a reactor with three reaction zones and a stripper column.

In FIG. 7a, since fresh ethylene is fed directly to the first reaction zone 110 and the second reaction zone 120 as part of the H$_2$ poor bottom gas 102, the third reaction zone 130 receives ethylene only from the reactor off-gas.

Figure 7B:
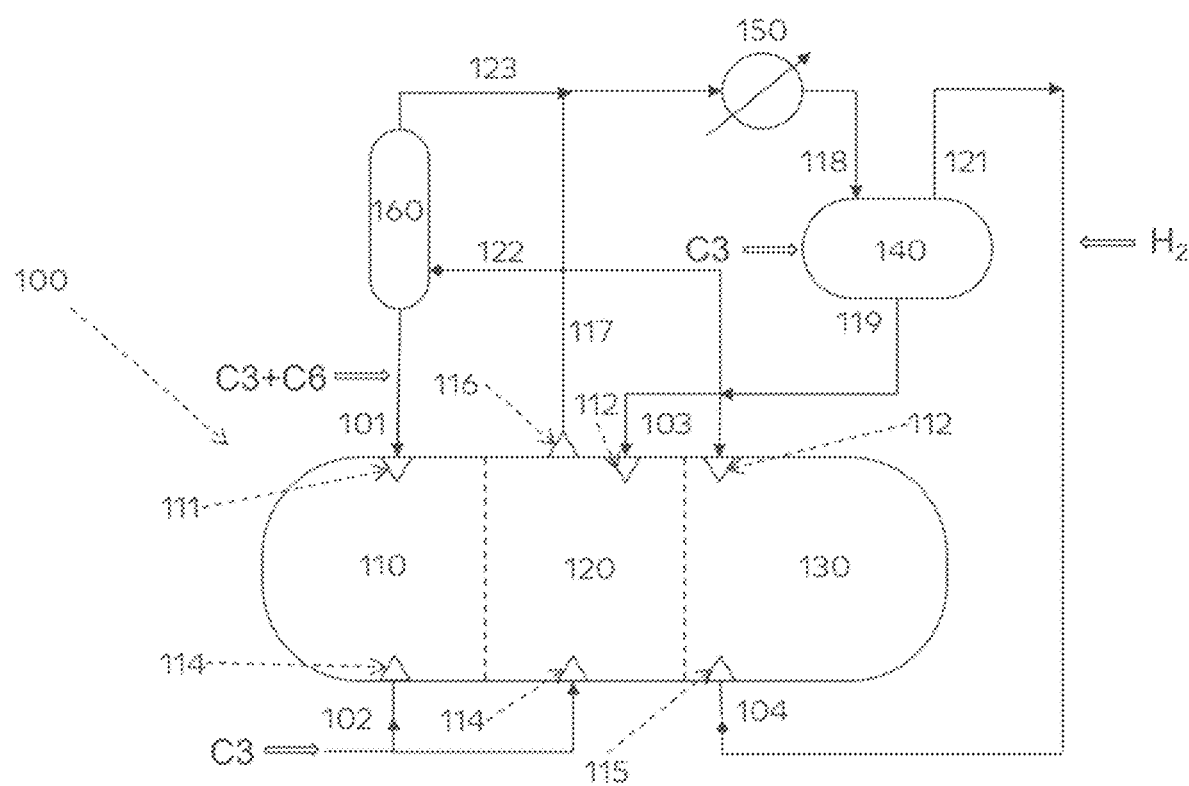

In FIG. 7b, since fresh 1-hexene is fed directly to the first reaction zone 110 as the H$_2$ poor quench liquid 101, the second and the third reaction zones 120 and 130 receive 1-hexene only from the reactor off-gas.

Figure 8A:
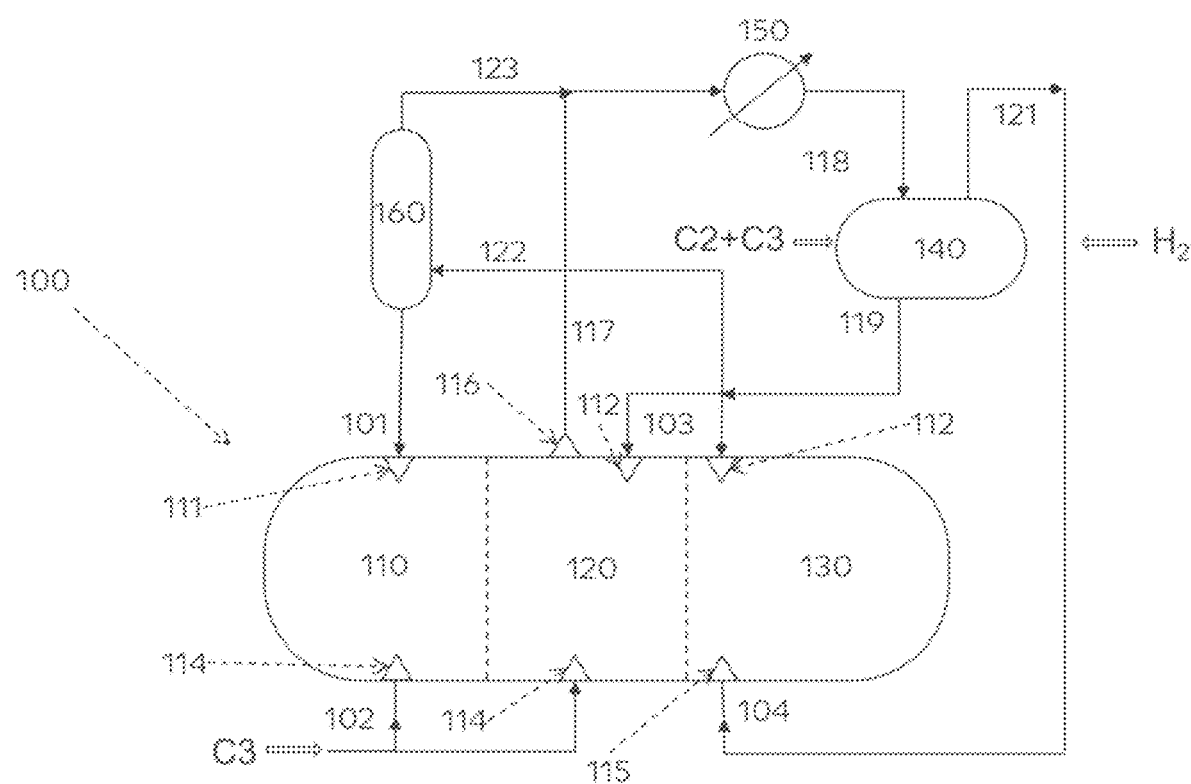

In FIG. 8a, since fresh ethylene is fed in the system through the separator 140 and due to Its low molecular weight a largest portion will be Introduce Into the third reaction zone 130 as H$_2$ rich bottom gas 104. A very small amount dissolved in the liquid mixture will be introduce into the second and third reaction zone as a part H$_2$ rich quench liquid 103.

The first reaction zone 110 will only contain trace of ethylene as the majority of it will be remove by the stripper in the same time that H$_2$. Thus, the first part of the reactor should have a very low concentration, but the concentration will be increasing drastically toward the end of the reactor.

Figure 8B:
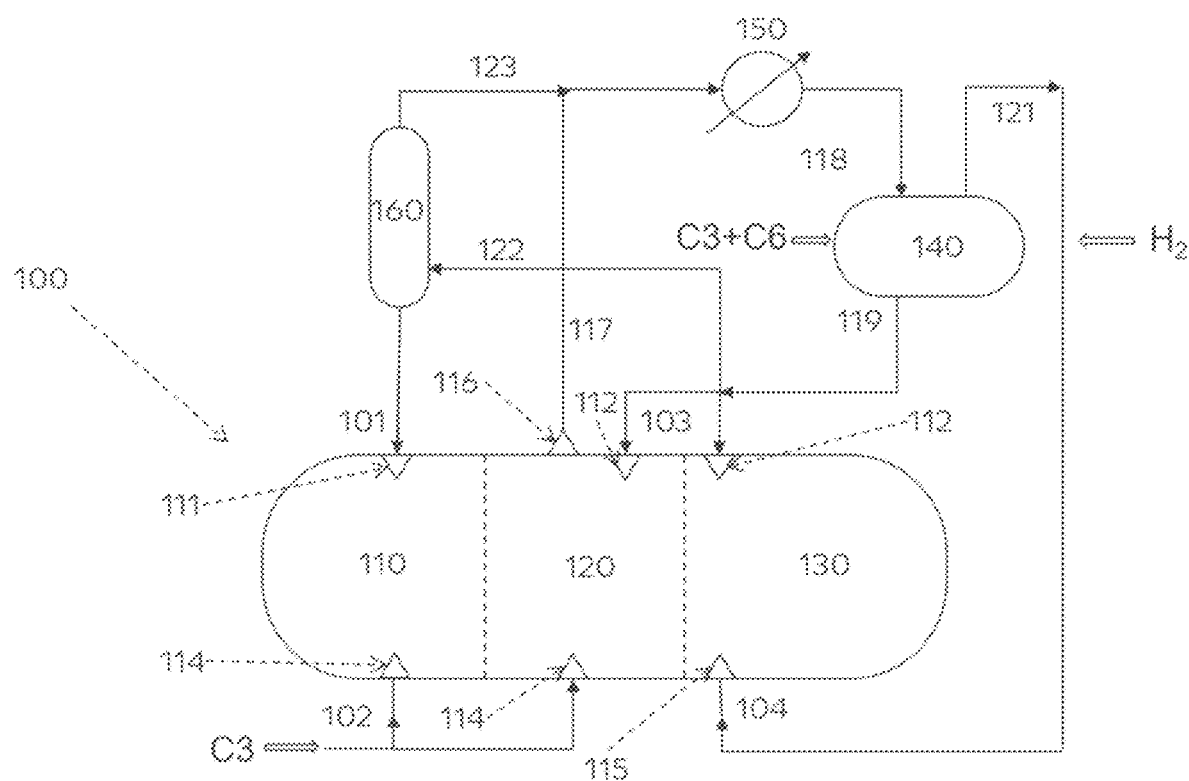

In FIG. 8b, since fresh 1-hexene is fed in the system through the separator 140 and will be introduce into the first liquid stream 119.

In this embodiment, due to the presence of the stripper loop alimented by a portion of the first liquid stream 119, very parts of the reactor will be fed.

Therefore, the repartition of the first liquid stream 119 in to the H$_2$ rich quench liquid 103 and the liquid stream line 122 will determine the concentration profile of 1-hexene through the entire reactor. In an embodiment no illustrated, the absence of a stripper loop will allow to have higher concentration in the second and third reaction zone (as in FIGS. 3b and 4b).

Figure 9A:
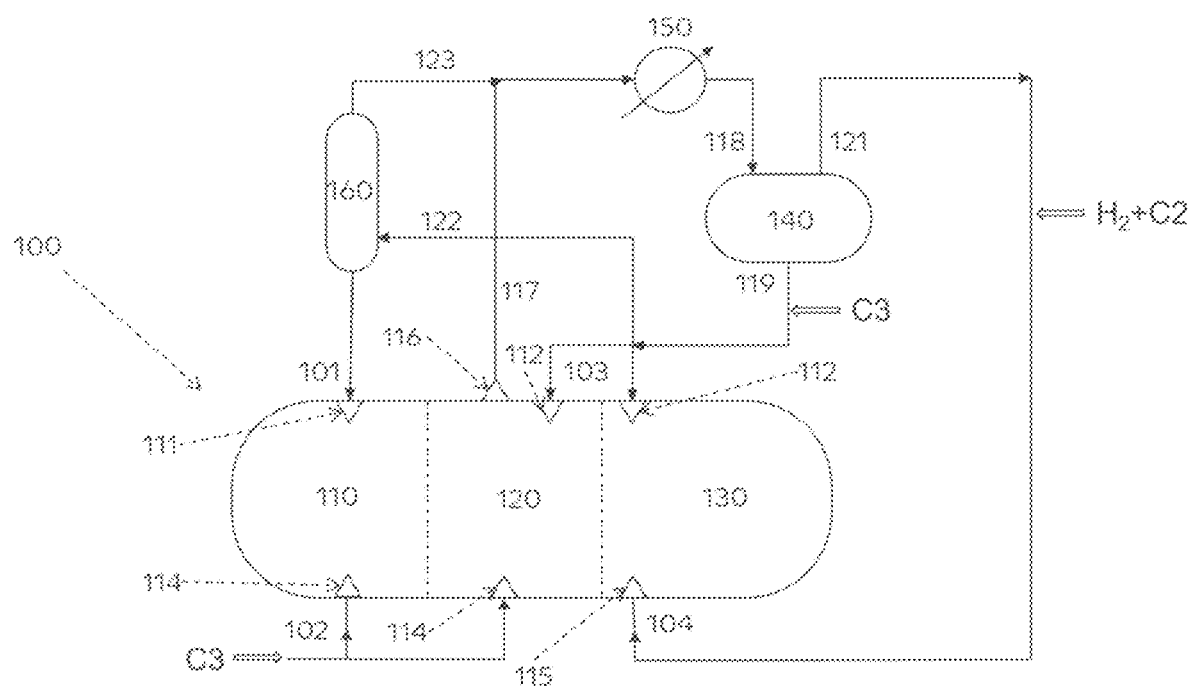

In FIG. 9a, the fresh ethylene is fed directly to the third reaction zone 130 as part of the H$_2$ rich bottom gas 104. The second reaction zone 120 will only receive a very small amount of ethylene coming from the small portion dissolved in the liquid mixture 119 issue from the reactor off-gas 117. As in FIG. 8a, the first reaction zone will only contain minimal trace of ethylene and the concentration will be increasing drastically toward the end of the reactor.

Figure 9B:
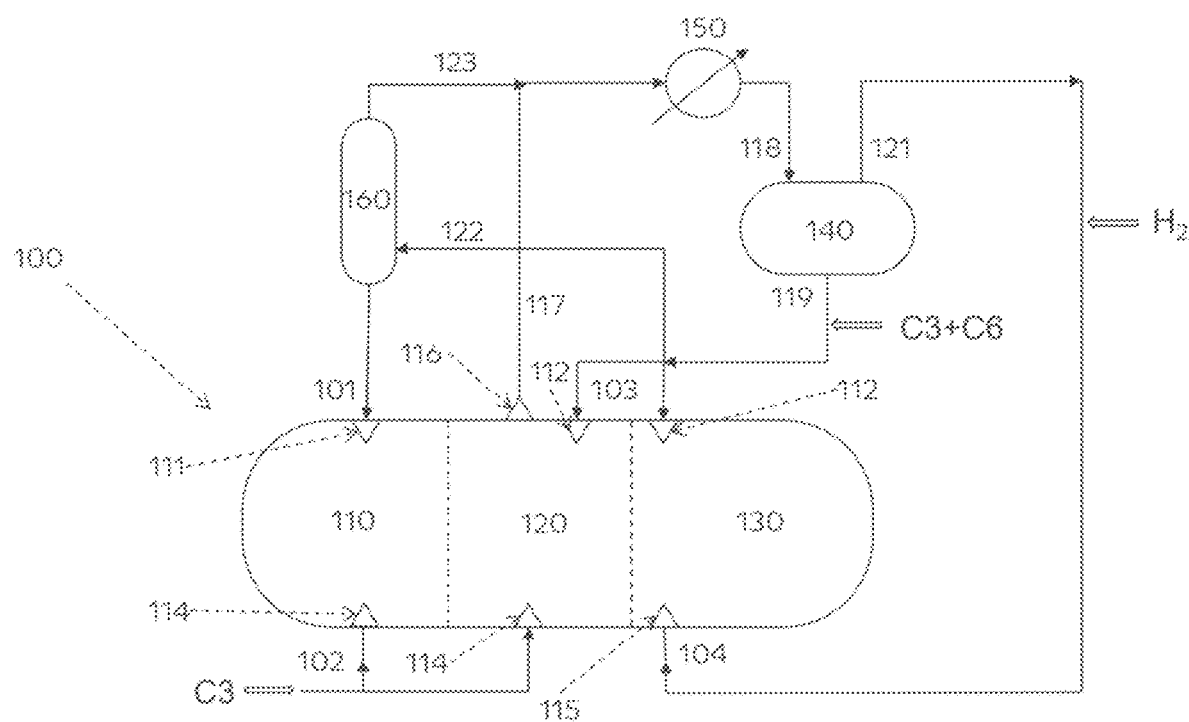

In the embodiment illustrated in FIG. 9b, fresh 1-hexene is fed in the system only as a part of the first liquid stream 119. The concentration profile will be similar to the one in FIG. 8b.

Figure 10A:
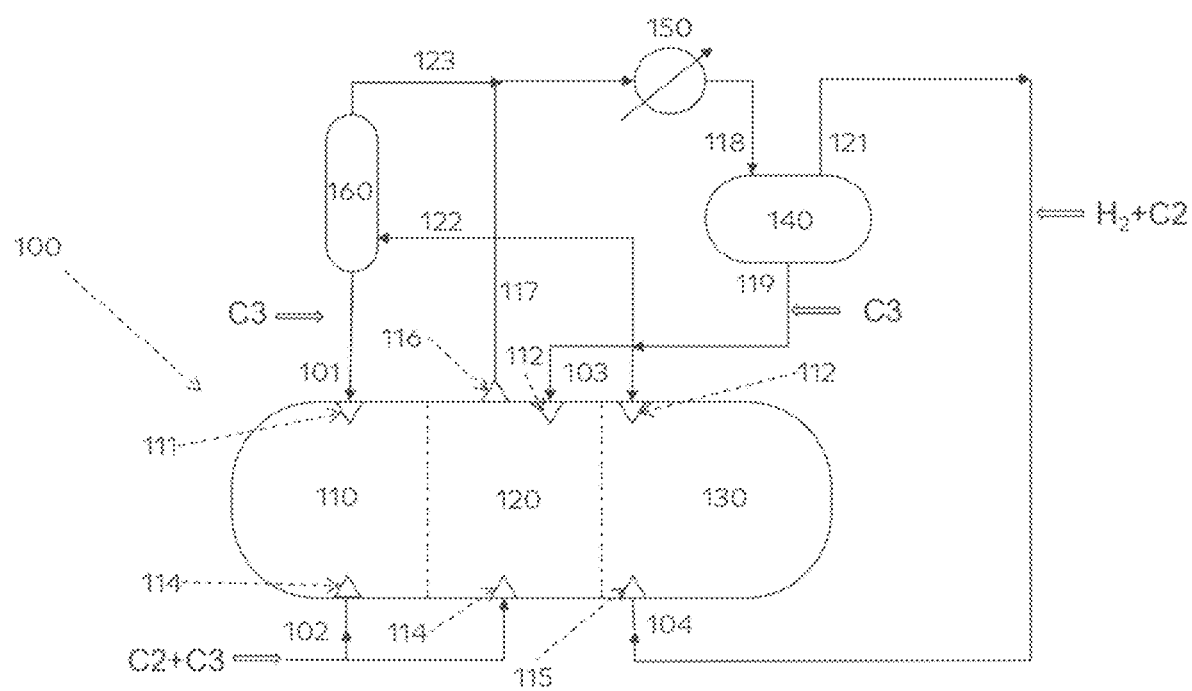

In FIG. 10a, the fresh ethylene is fed directly as a part of the H$_2$ poor bottom gas 102 and as a part of the H$_2$ rich bottom gas 104, the concentration should be flat in the two first part of the reactor but Increasing in the last part of the reactor due to the recycling of the a reactor off-gas and the stripper loop. Indeed, due to the low molecular weight of ethylene, the majority of the ethylene containing in the reactor off-gas 117, will be reintroduce only as a part of the H$_2$ rich bottom gas 104.

Figure 10B:
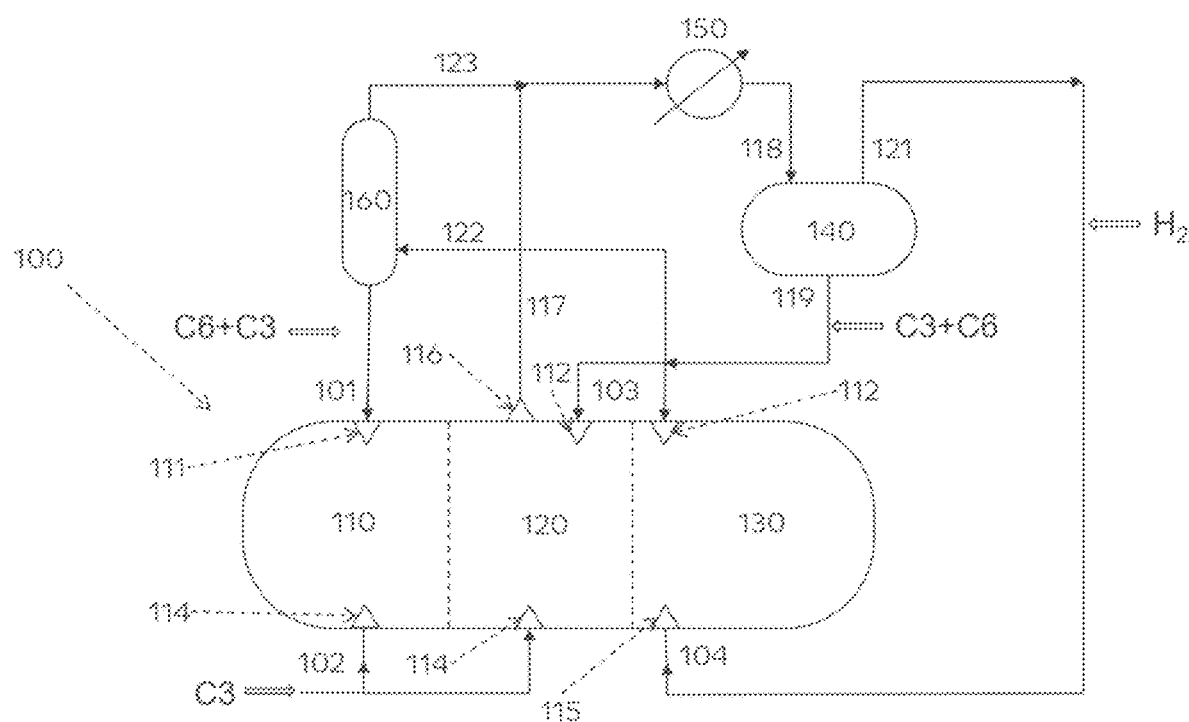
Figure 11A:
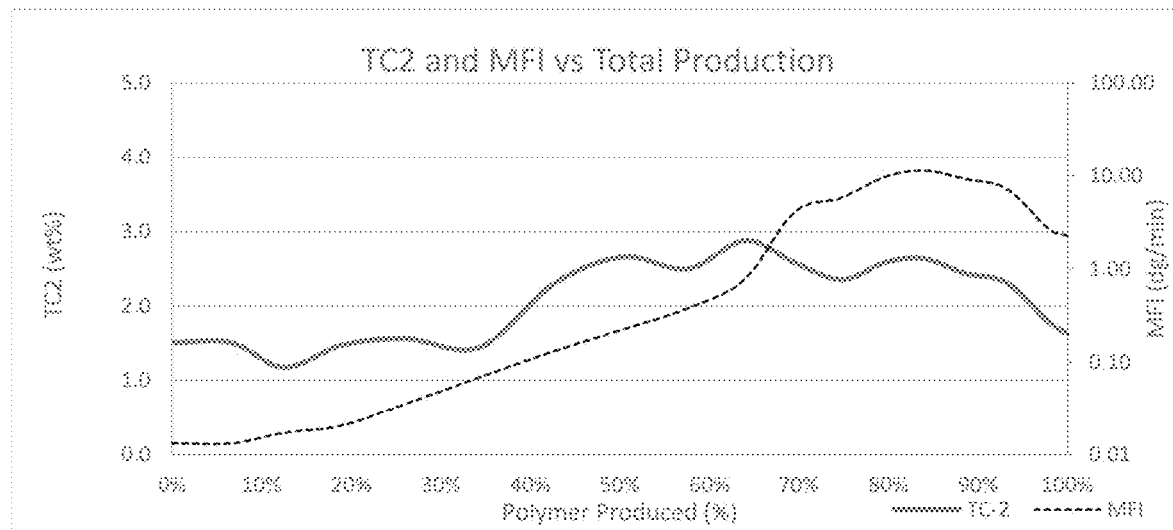
FIG. 11a to 12j show a graph comprising Mass fraction (wt %) and Melt flow Index MFI (dg/min) over Total Production (%) for each examples.
Figure 11B:
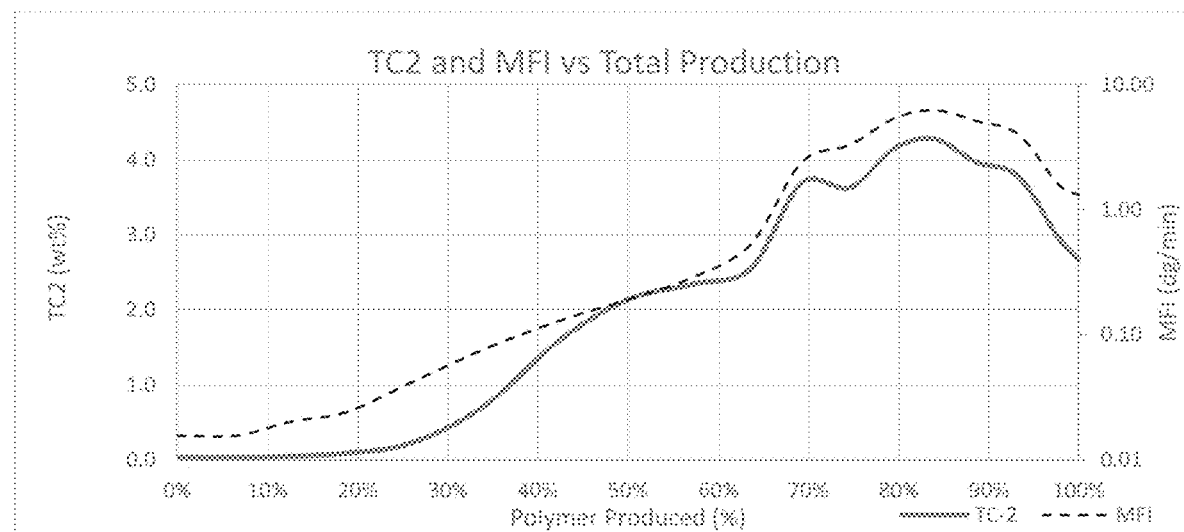
Figure 11C:
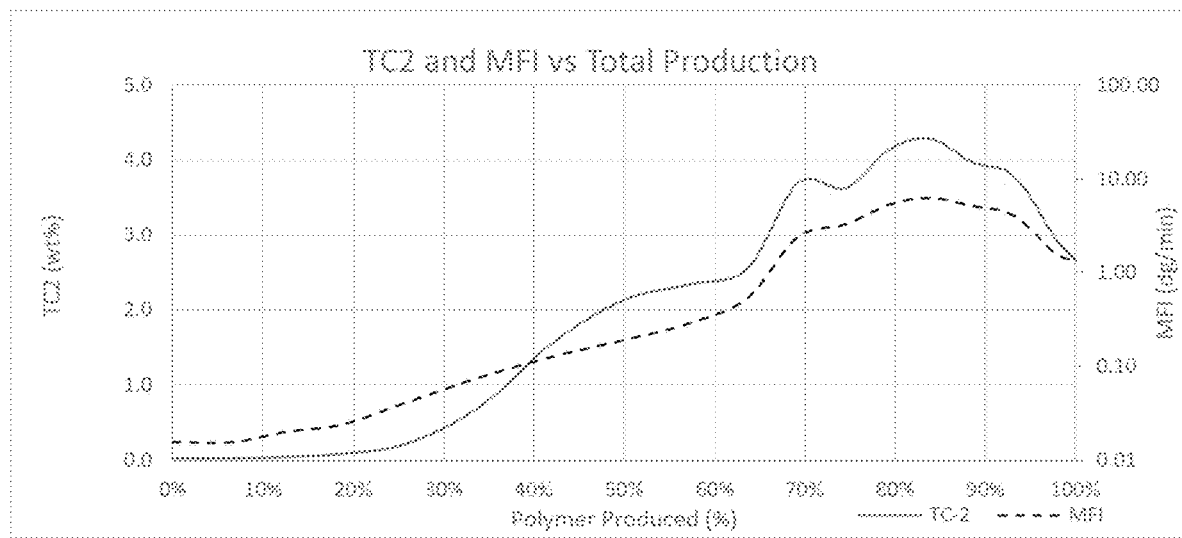
Figure 11D:
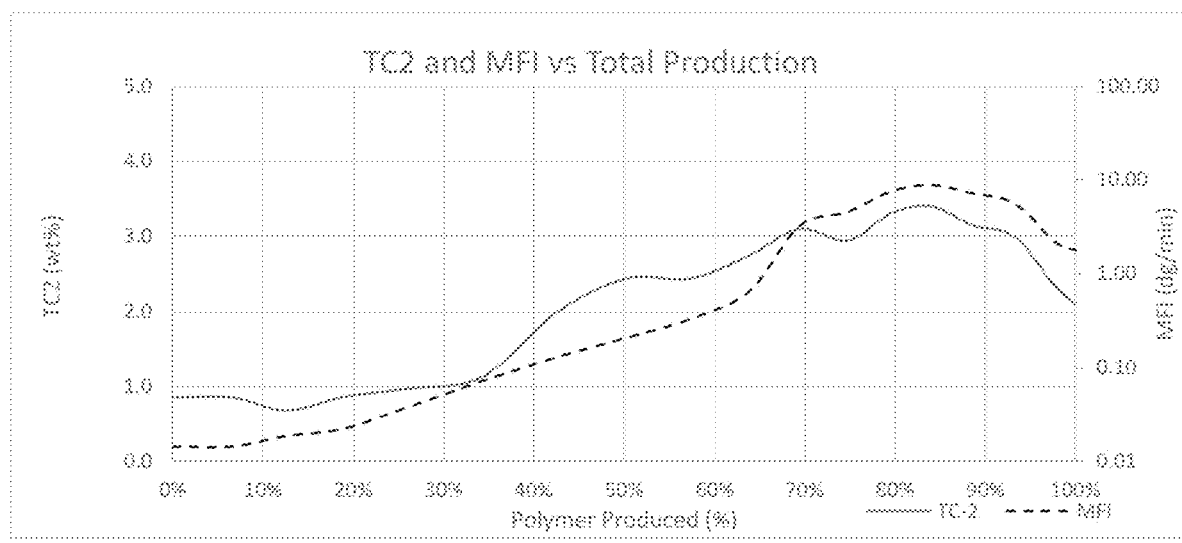
Figure 11E:
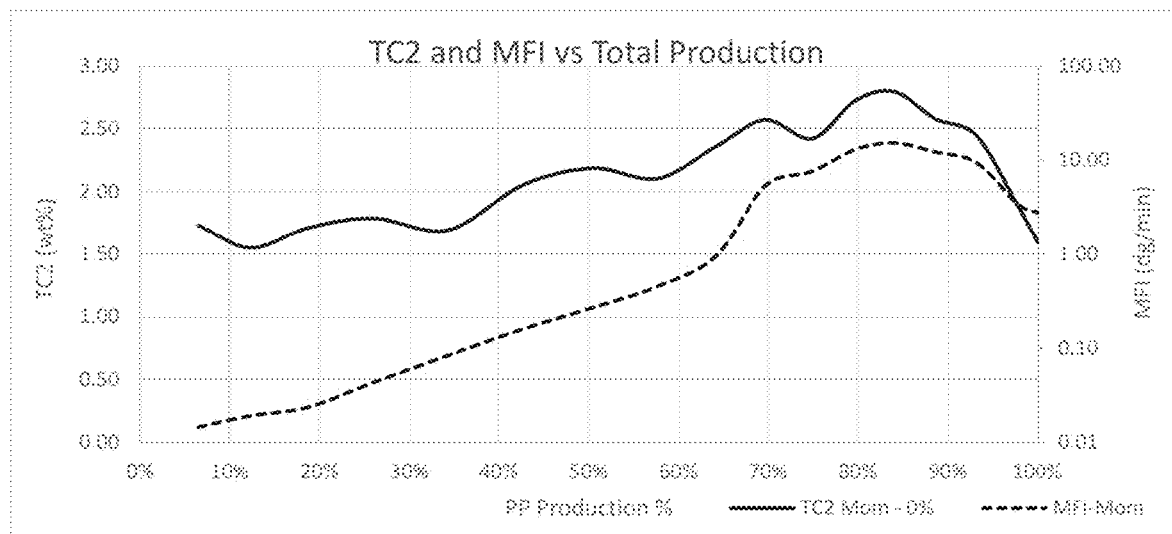
Figure 11F:
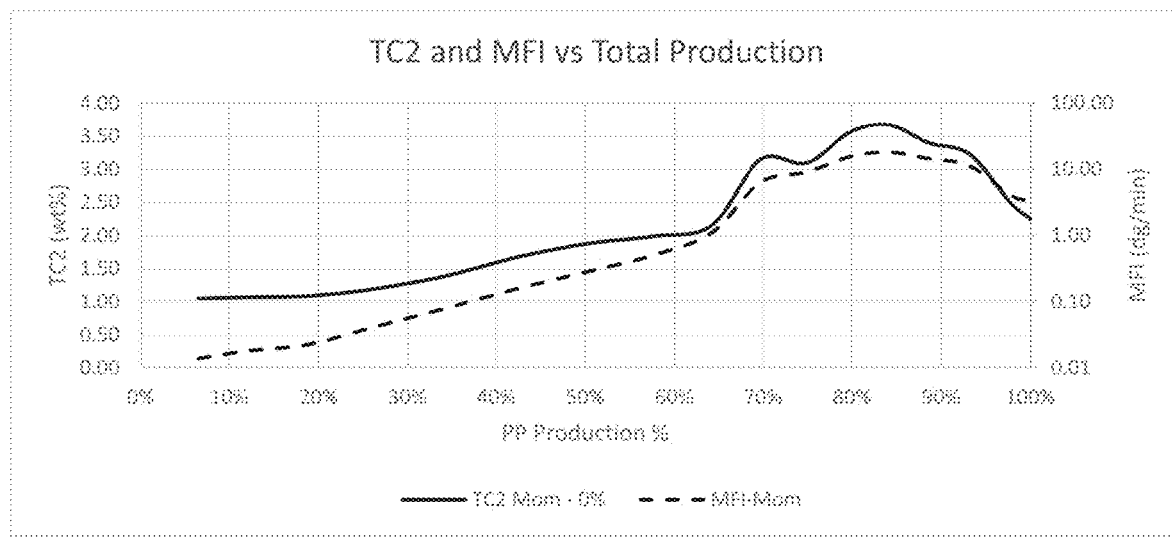
Figure 11G:
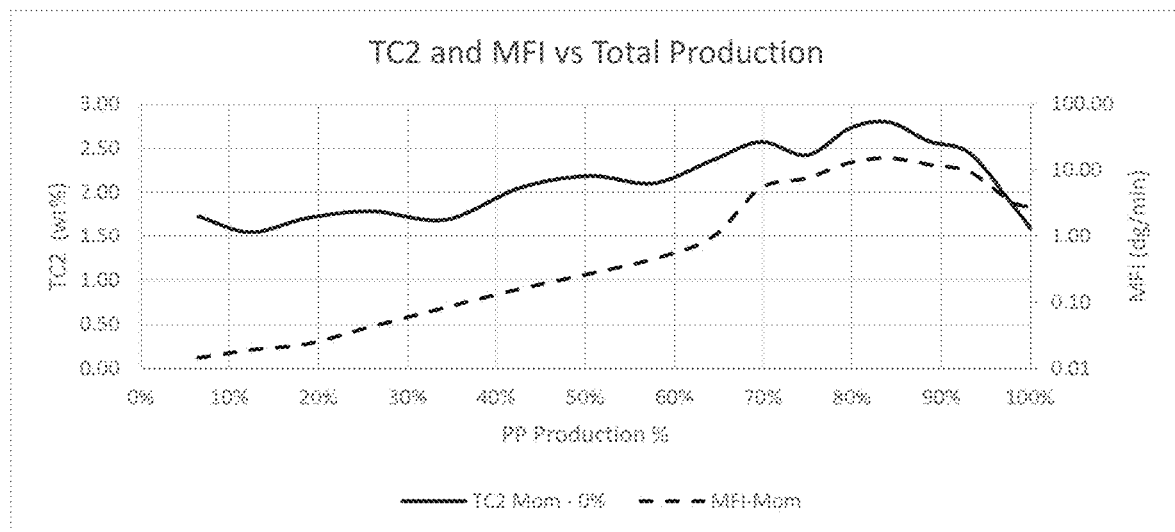
Figure 11H:
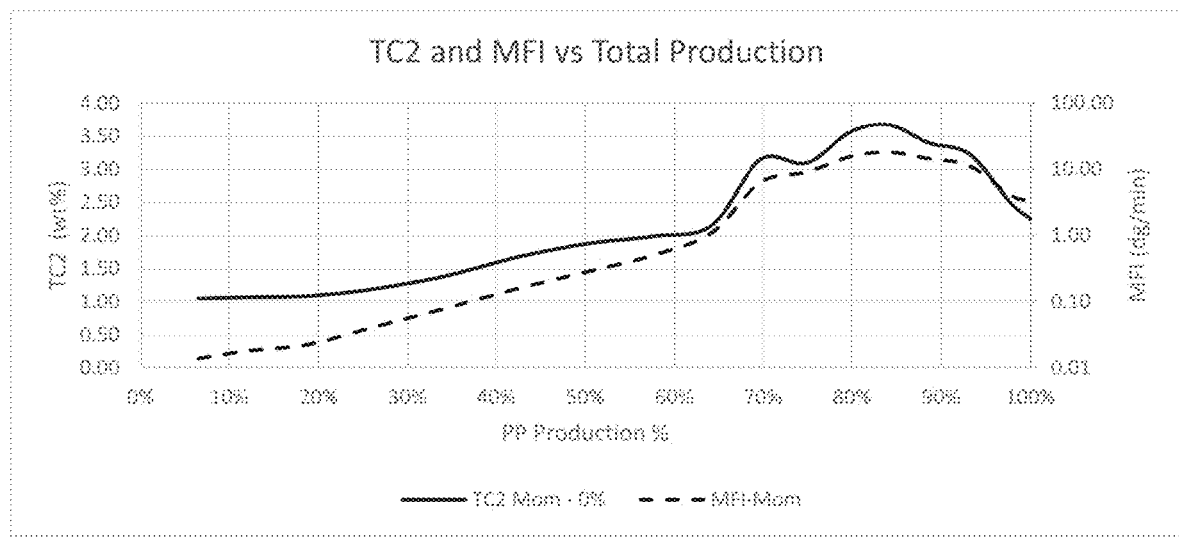
Figure 11I:
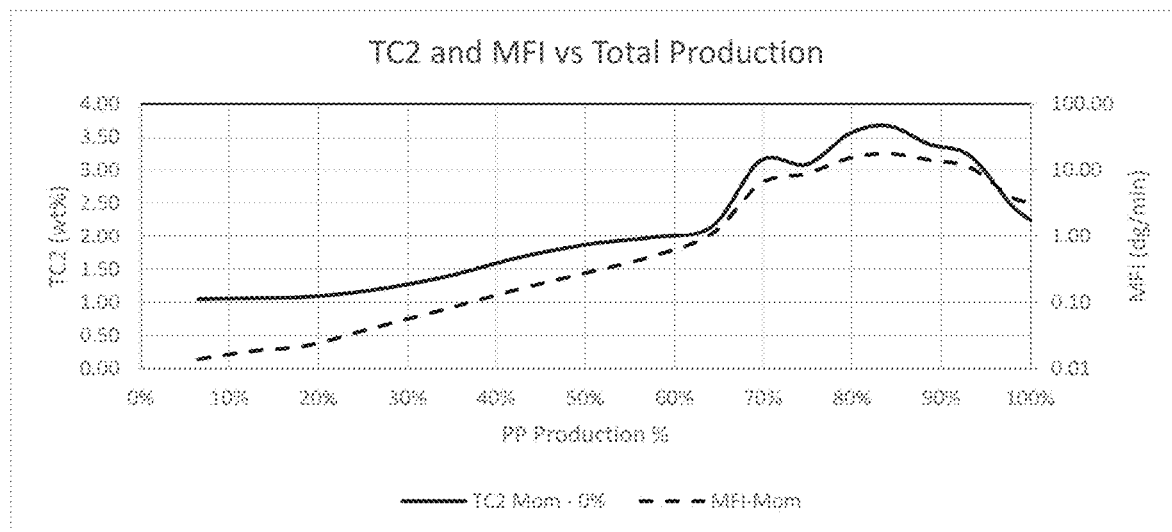
Figure 11J:
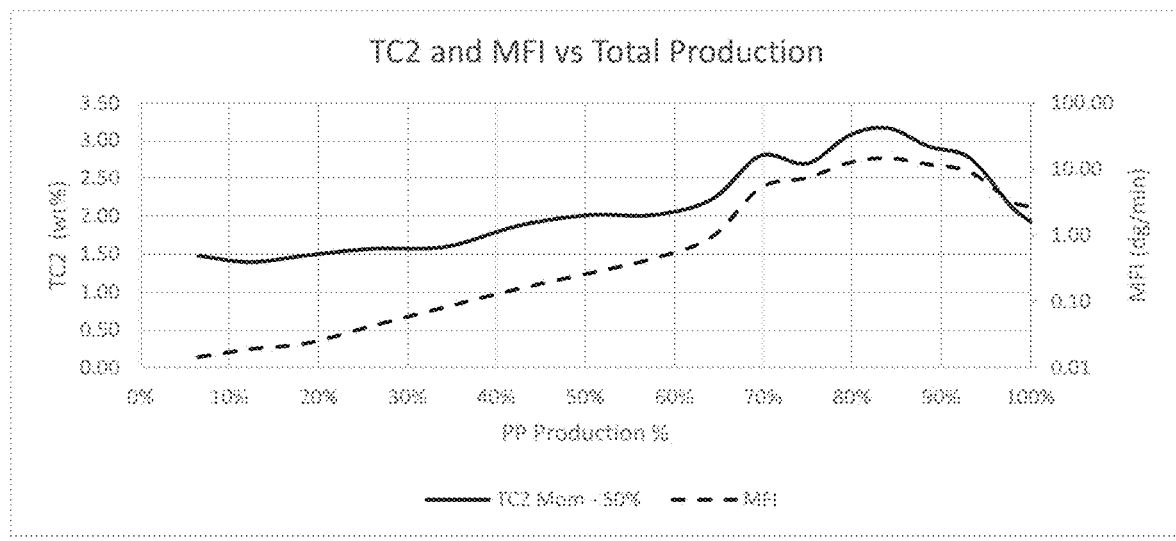
Figure 12A:
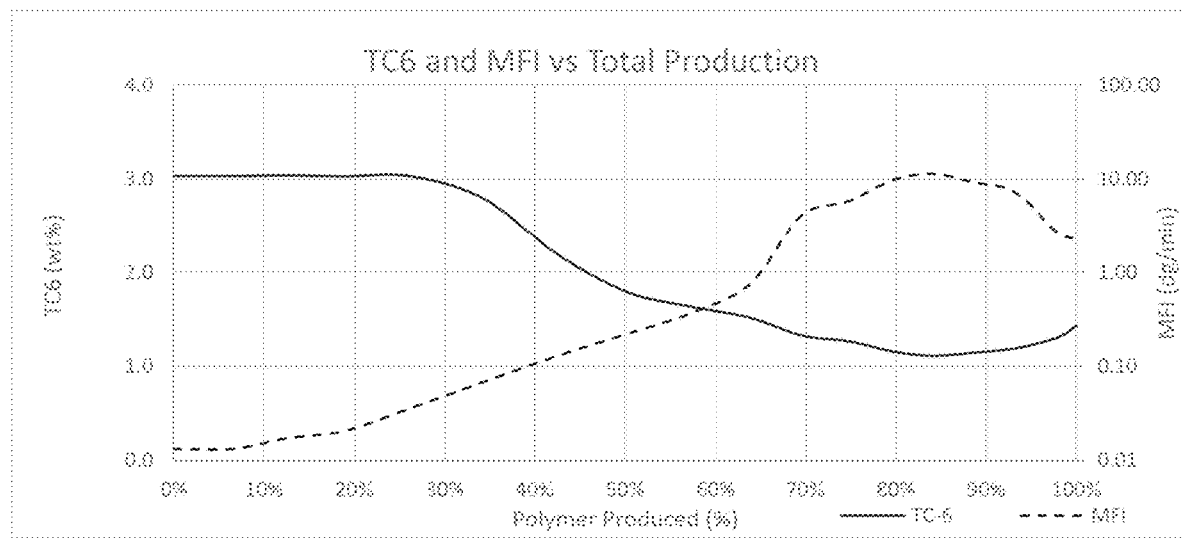
Figure 12B:
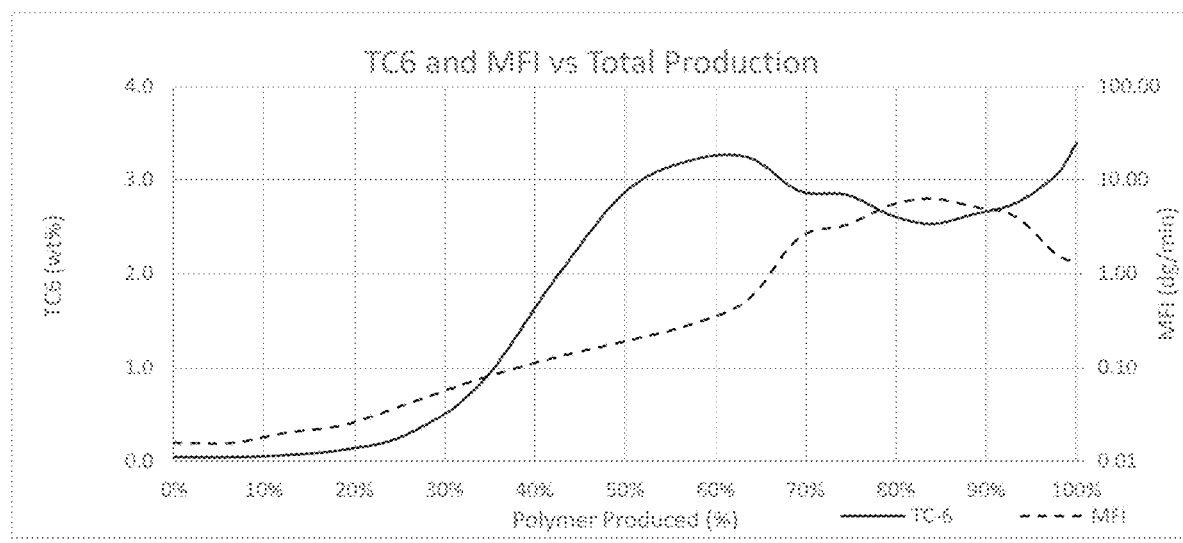
Figure 12C:
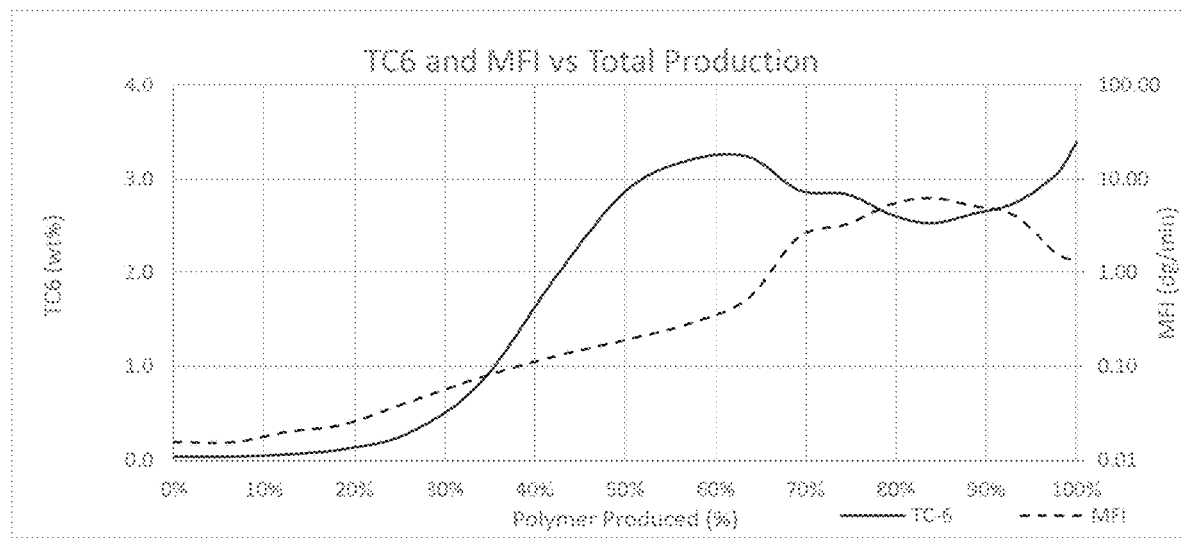
Figure 12D:
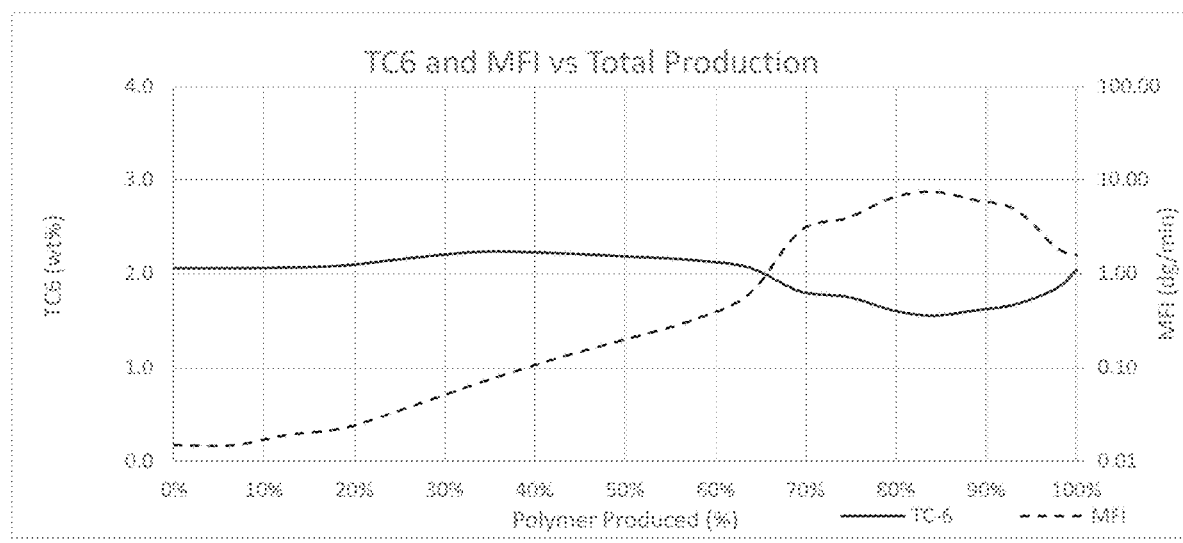
Figure 12E:
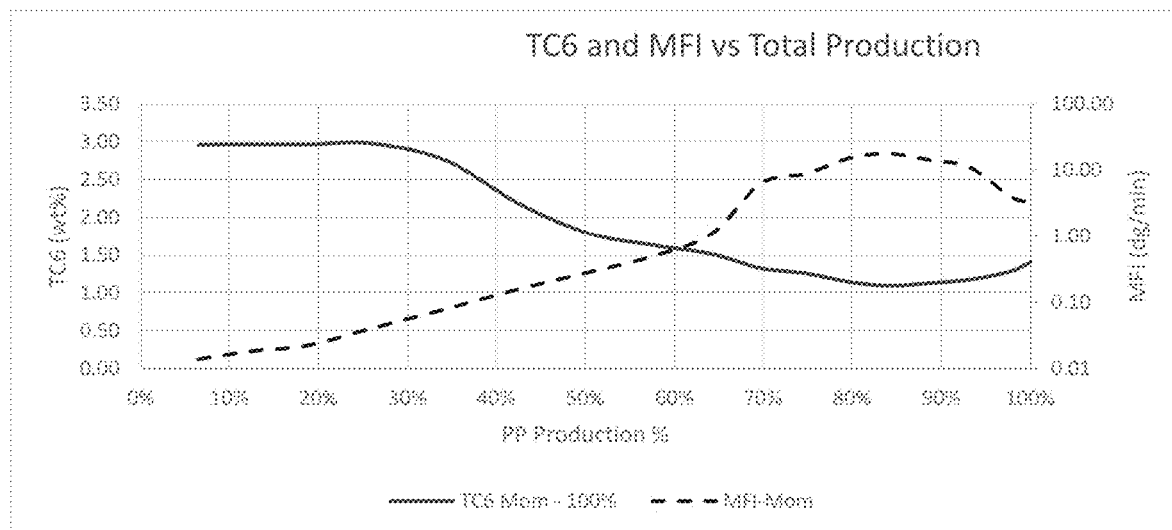
Figure 12F:
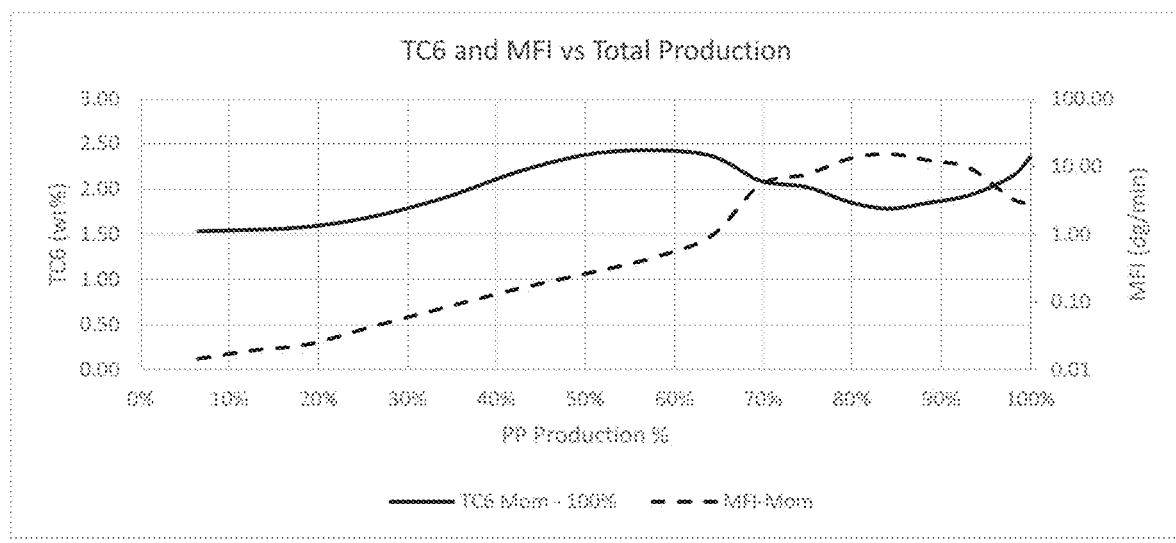
Figure 12G:
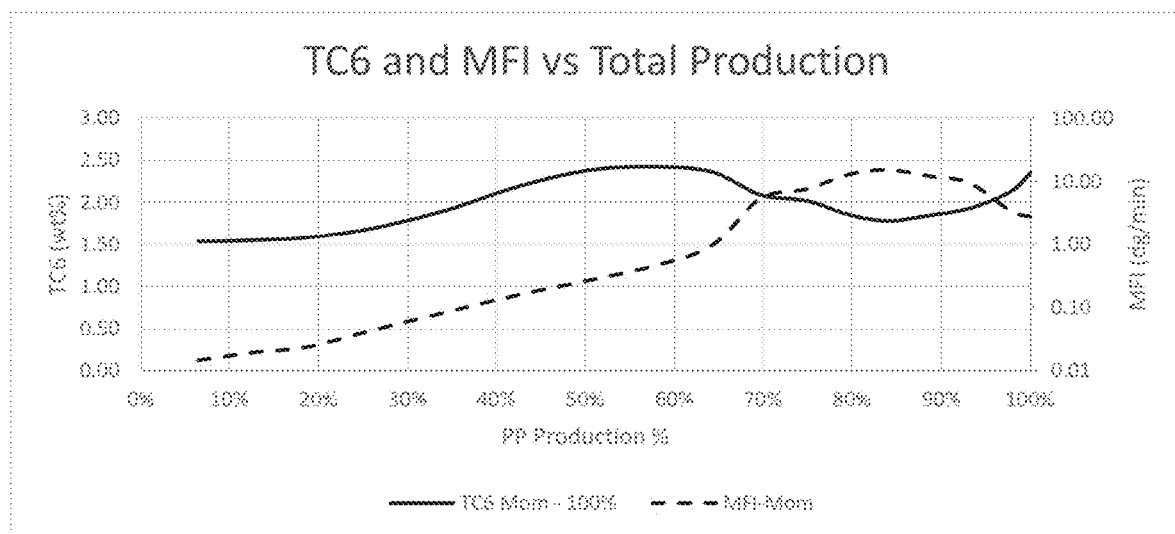
Figure 12H:
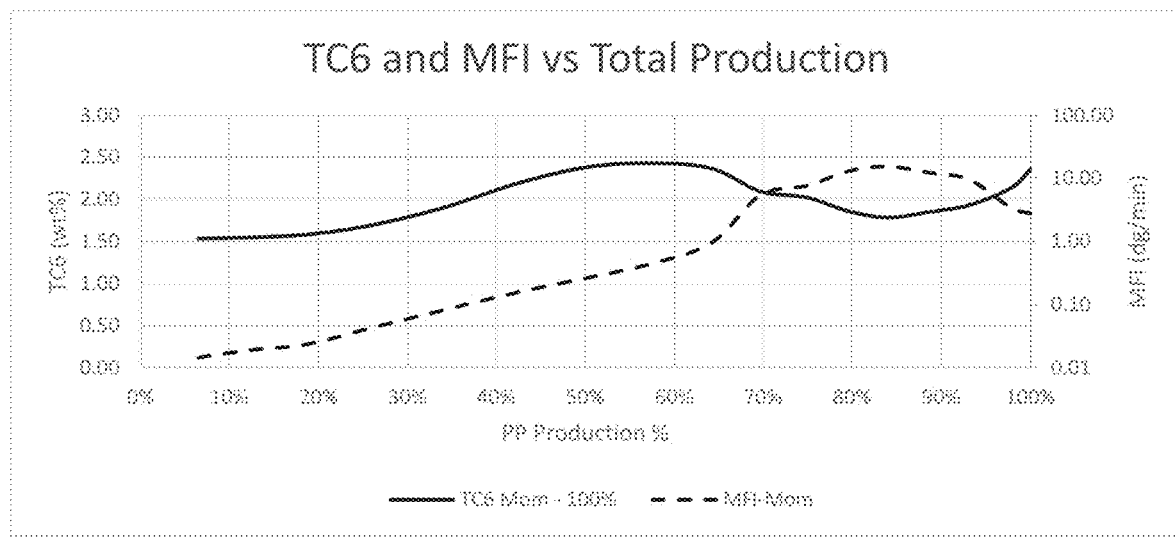
Figure 12I:
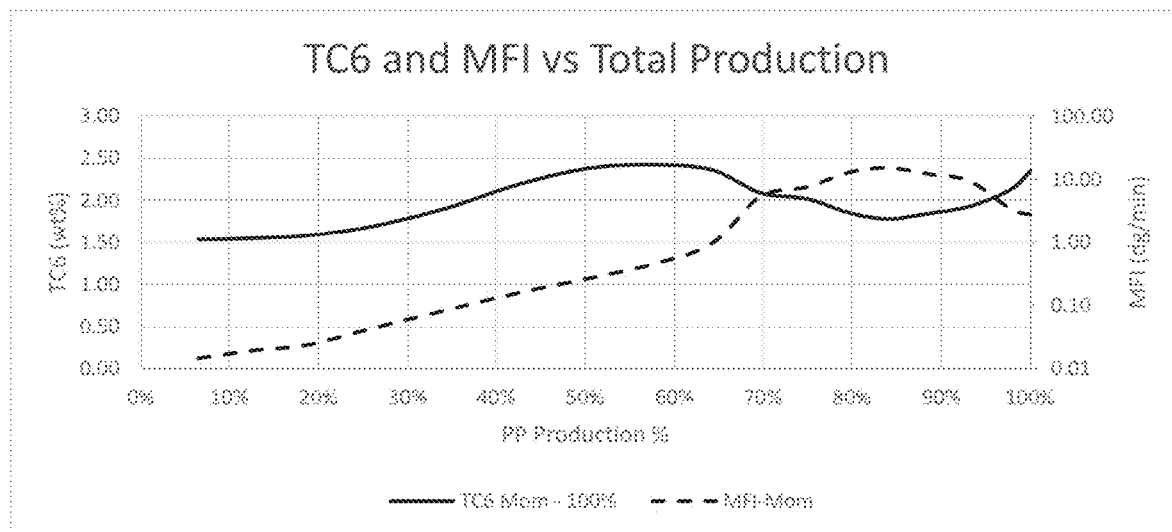
Figure 12J:
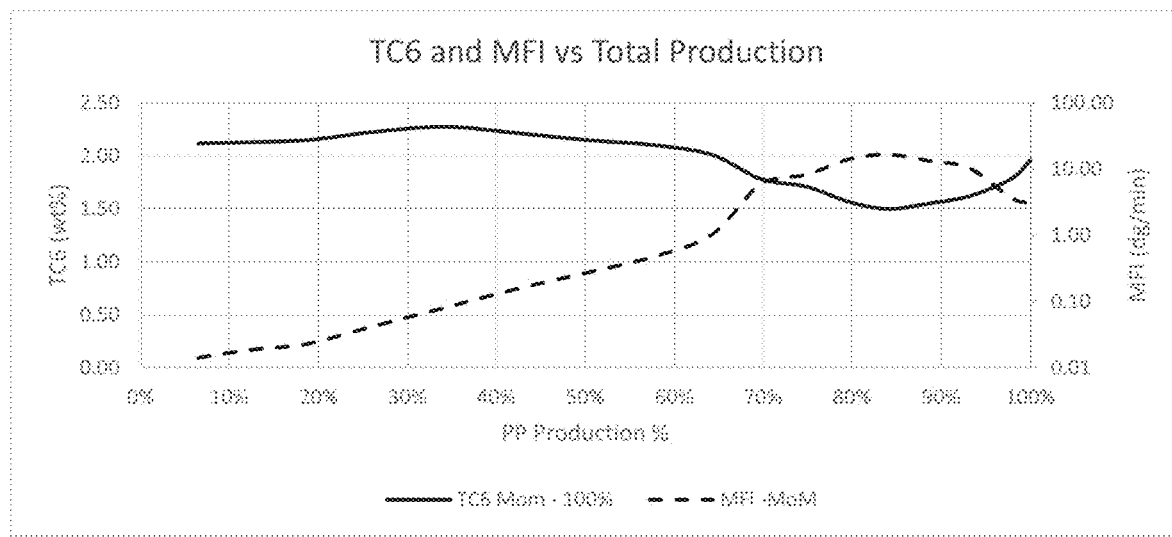

In FIG. 10b, the fresh 1-hexene Is fed directly as a part of the H$_2$ poor quench liquid 101 and as a part of the H$_2$ rich quench liquid 103. Therefore the concentration 1-hexene of would be relatively flat in the reactor.

However, the repartition of the first liquid stream line 119 between lines 122 and 103 will be able to control the concentration gradient. The concentration will be higher in the first zone of the majority of the stream is redirected trough the stripper, and will be lower if the majority of the stream is redirected trough the H$_2$ rich quench liquid 103.

In addition, in non-limitative embodiments of the invention (non-illustrated by the figures) and mentioned above, a configuration with a reactor with three reaction zones and without a stripper loop is possible.

Mass Fraction (Wt %) and Melt Flow Index MFI (Dg/Min) Over Total Production (%) Graphs The following graphs refer to the example 1a to 10b, performed under the same operational parameters; the only variable was the localization of the fresh comonomer feeding.

The FIGS. 11a to 11j corresponding to FIG. 1a to 10a, and the FIGS. 12a to 12j corresponding to FIG. 1b to 10b.

Figure 13:
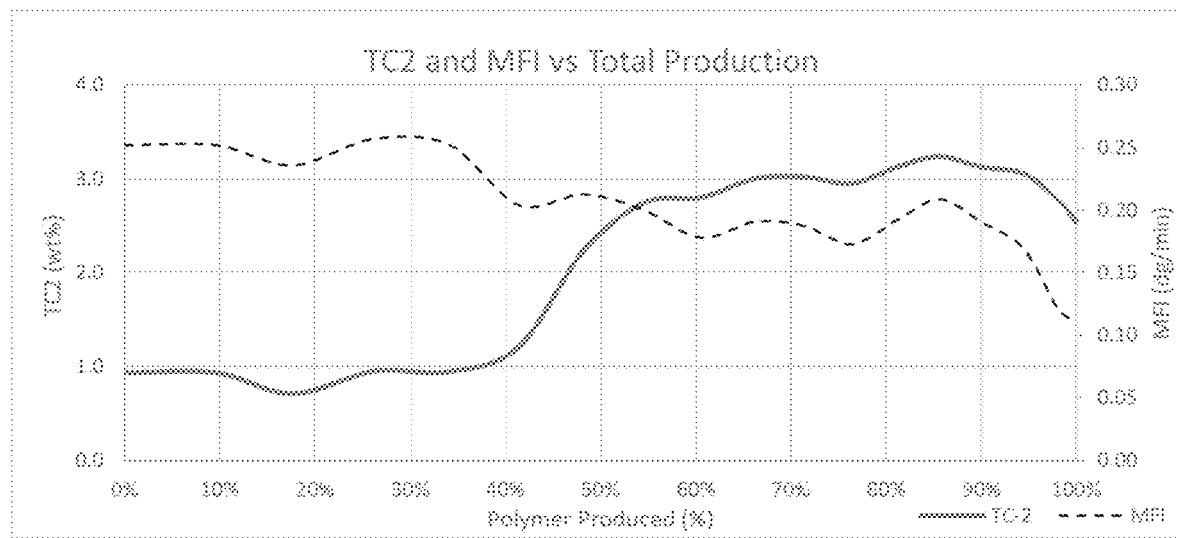
FIGS. 13 and 14 show a graph comprising Mass fraction (wt %) and Melt flow Index MFI (dg/min) over Total Production (%) for prior art setup assembly without means to control a concentration gradient of comonomer.
Figure 14:
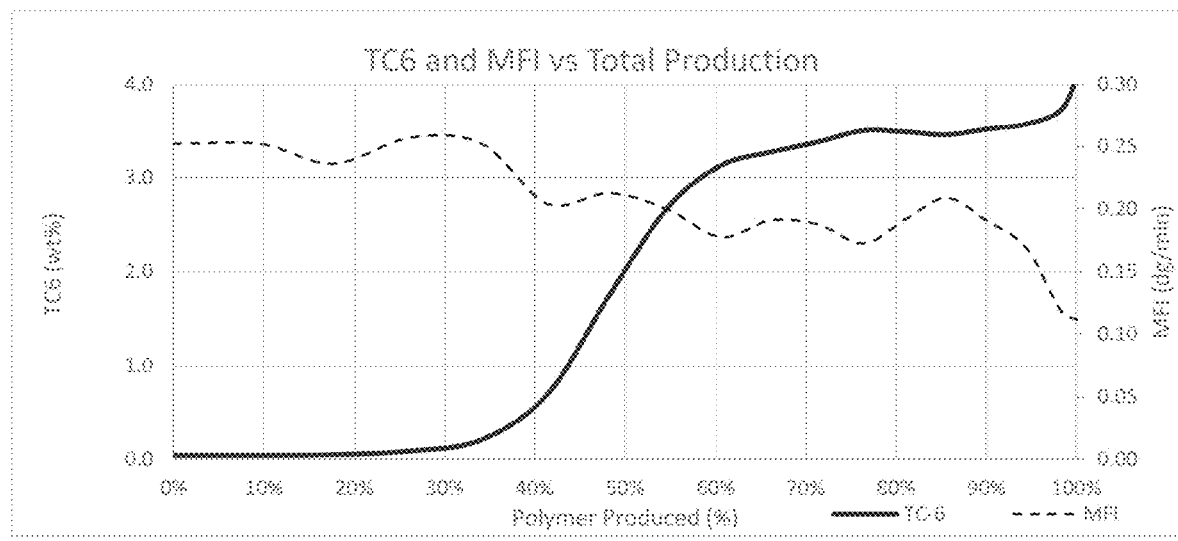

In addition, the FIGS. 13 and 14 are related to prior art setup assembly wherein no control gradient can perform. In those embodiments, the comonomer concentration can only go crescendo.

With the setup assembly for the production of polypropylene according to the invention, those graphs show that the gradient of comonomer can be control and therefor, new grade of polypropylene can be produce with specific melt flow index and new properties.

LIST OF REFERENCE SIGNS 100 an horizontal stirred reactor
101 H$_2$ poor quench liquid
102 H$_2$ poor bottom gas
103 H$_2$ rich quench liquid
104 H$_2$ rich bottom gas
110 a first reaction zone
111 a first set of the liquid feed ports
112 second set of the liquid feed ports
114 a first set of gas feed ports 115 a second set of gas feed ports
116 off-gas ports
117 a reactor off-gas
118 a gas liquid mixture line
119 a first liquid stream line
120 a second reaction zone
121 a first gas stream
122 a part of the first liquid stream 119
123 a rich $H_2$ line
130 a third reaction zone
140 a separator
150 a condenser
160 a stripper column
116 off-gas ports

The invention claimed is:

1. A process for production of a propylene based copolymer, comprising:
propylene,
a comonomer selected from ethylene or a C4-C12 α-olefin,
wherein the said process is performed in the presence of a catalyst system in a horizontal stirred reactor (100) comprising:
an agitated bed for forming polymer particles,
a plurality of liquid feed ports (111, 112) that are subsequently arranged along a top side of the reactor above the agitated bed, the plurality of liquid feed ports comprising at least a first set of the liquid feed ports (111) and a second set of the liquid feed ports (112) arranged subsequent to the first set of the liquid feed ports in a downstream direction of the process, and
a plurality of gas feed ports (114, 115) that are subsequently arranged along a bottom side of the reactor below the agitated bed, the plurality of gas feed ports comprising at least a first set of gas feed ports (114) and a second set of gas feed ports (115) arranged subsequent to the first set of gas feed ports in the downstream direction of the process,
a plurality of reactor off-gas ports (116) that are arranged along a top side of the reactor above the agitated bed,
wherein the process comprises the steps of:
recovering a reactor off-gas (117) comprising $H_2$, propylene, and comonomer from the reactor through the reactor off-gas ports (116),
feeding the reactor off-gas (117) to a condenser (150) to form a gas-liquid mixture (118),
feeding the gas-liquid mixture (118) to a separator (140) to obtain a first gas stream (121) and a first liquid stream (119):
the first gas stream (121) comprising:
$H_2$,
propylene, and
the comonomer when it is ethylene and
the first liquid stream (119) comprising:
$H_2$,
propylene, and
the comonomer when it is selected from a C4-C12 α-olefin,
wherein fresh propylene is optionally further fed to the system, through the separator (140) and/or added to the first liquid stream (119),
feeding the catalyst system to the reactor through a port arranged on the top side of the reactor,
feeding a $H_2$ poor quench liquid (101) comprising propylene through the first set of the liquid feed ports (111),
feeding a $H_2$ rich quench liquid (103) comprising:
$H_2$,
propylene, and
the comonomer,
to the reactor through the second set of liquid feed ports (112), wherein the $H_2$ rich quench liquid (103) comprises at least part of the first liquid stream (119),
feeding a $H_2$ poor bottom gas (102) comprising fresh propylene through the first set of gas feed ports (114),
feeding a $H_2$ rich bottom gas (104) comprising:
$H_2$,
propylene, and
the comonomer,
through the second set of gas feed ports (115), wherein the $H_2$ rich bottom gas (104) comprises at least part of the first gas stream (121), and
collecting the polymer particles formed in the agitated bed from the reactor, wherein the said process comprises the further following steps:
the comonomer, when it is ethylene, is fed to:
the reactor as
a part of the $H_2$ poor bottom gas (102) and/or
as part of the $H_2$ rich bottom gas (104)
and/or fed to the separator (140);
the comonomer when it is chosen from a group comprising a C4-C12 α-olefin, is fed:
to the reactor as:
a part of the $H_2$ poor quench liquid (101) and/or
a part of the $H_2$ rich quench liquid (103)
and/or to the separator (140).

2. The process according to claim 1, wherein the said comonomer is ethylene.

3. The process according to claim 1, wherein the said comonomer is selected from a C4-C12 α-olefin.

4. The process according to claim 3, wherein the said comonomer is 1-butene.

5. The process according to claim 3, wherein the said comonomer is 1-hexene.

6. The process according to claim 1, wherein a part (122) of the first liquid stream (119) is fed to a $H_2$ stripper (160) to remove $H_2$ to form a second liquid stream comprising propylene and the comonomer.

7. The process according to claim 6, wherein at least part of the second liquid stream is fed to the reactor as a part of the $H_2$ poor quench liquid (101).

8. The process according to claim 6, wherein at least part of the second liquid stream is vaporized and fed as a part of the $H_2$ poor bottom gas (102).

9. The process according to claim 1, wherein the reactor off-gas is fed to a cyclone from which polymer particles are carried back to the reactor by means of the $H_2$ poor gas stream (102).

10. The process according to claim 1, wherein the catalyst system is a Ziegler-Natta catalyst system, wherein the Ziegler-Natta catalyst system comprises a procatalyst, a co-catalyst and optionally an external electron donor, wherein the procatalyst is obtained by a process comprising the steps of Step A) providing or preparing a compound $R^4_z MgX^4_{2-z}$
wherein
$R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group is substituted or unsubstituted, and optionally contain one or more heteroatoms;

$X^4$ is independently selected from the group consisting of fluoride (F—), chloride (Cl—), bromide (Br—) or iodide (I—);

z is in a range of larger than 0 and smaller than 2, being $0<z<2$;

Step B) contacting the compound $R^4{}_z MgX^4{}_{2-z}$ with a silane compound $Si(OR^5)_{4-n}R^6)_n$ to give a first intermediate reaction product, being a solid $Mg(OR^1)_x X^1{}_{2-x}$ wherein $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contain one or more heteroatoms;

$X^1$ is independently selected from the group consisting of fluoride (F—), chloride (Cl—), bromide (Br—) or iodide (I—);

n is in range of 0 to 4, preferably n is from 0 up to and including 1;

z is in a range of larger than 0 and smaller than 2, being $0<z<2$;

x is in a range of larger than 0 and smaller than 2, being $0<x<2$;

Step C) activating said solid support, comprising two sub steps:

Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contain one or more heteroatoms; and a second activating compound being an activating electron donor; and Step C2) a second activation step by contacting the activated solid support obtained in step C1) with an activating electron donor; to obtain a second intermediate reaction product;

Step D) reacting the second intermediate reaction product obtained step C2) with a halogen-containing Ti-compound, optionally an activator prior to or simultaneous with the addition of an internal donor, and at least one internal electron donor to obtain said procatalyst.

11. The process according to claim 1, wherein the reactor is provided with two reaction zones that are arranged subsequent to each other in the downstream direction of the process, wherein
 a first reaction zone (110) of said two reaction zones is fed with the $H_2$ poor quench liquid (101) and the $H_2$ poor bottom gas (102), and
 a second reaction zone (120) of said two reaction zones is fed with the $H_2$ rich quench liquid (103) and the $H_2$ rich bottom gas (104).

12. The process according to claim 1, wherein the reactor is provided with three reaction zones that are arranged subsequent to each other in the downstream direction of the process, wherein
 a first reaction zone (110) of said three reaction zones is fed with the $H_2$ poor quench liquid (101) and the $H_2$ poor bottom gas (102),
 a second reaction zone (120) of said three reaction zones is fed with either i) the $H_2$ poor quench liquid (101) and the $H_2$ rich bottom gas (104) or ii) the $H_2$ rich quench liquid (103) and the $H_2$ poor bottom gas (102), and
 a third reaction zone (130) of said three reaction zones is fed with the $H_2$ rich quench liquid (103) and the $H_2$ rich bottom gas (104).

13. Setup assembly for the production of polypropylene comprising at least:
 a horizontal stirred reactor (100) comprising
  an agitated bed for forming polymer particles with at least two reaction zones,
  a plurality of liquid feed ports (111, 112) that are subsequently arranged along a top side of the reactor above the agitated bed, the plurality of liquid feed ports comprising
   a first set of the liquid feed ports (111) and
   a second set of the liquid feed ports (112) arranged subsequent to the first set of the liquid feed ports in a downstream direction of the process, and
  a plurality of gas feed ports (114, 115) that are subsequently arranged along a bottom side of the reactor below the agitated bed, the plurality of gas feed ports comprising
   a first set of gas feed ports (114) and
   a second set of gas feed ports (115) arranged subsequent to the first set of gas feed ports in the downstream direction of the process
  a plurality of off-gas ports (116) arranged along a top side of the reactor above the agitated bed in a downstream direction of the process
 a recycle loop comprising:
  a condenser (150) connected to the horizontal stirred reactor (100) by the plurality of off-gas ports (116), and
  a separator (140) connected
   to the condenser by a gas liquid mixture line (118) and
   to the horizontal stirred reactor by
    a first liquid stream line (119) to the second set of the liquid feed ports (112), and
    a first gas stream line (121) to the second set of gas feed ports (115).

14. Setup assembly according to claim 13, further comprising a stripper (160) configured to remove at least $H_2$ and connected to
 to the separator (140) through a liquid stream line (122) which is a part of the first liquid stream (119)
 to the first set of the liquid feed ports (111) of horizontal stirred reactor (100) through a poor $H_2$ line configured to carry on a $H_2$ poor quench liquid produce by the stripper, and
 to the condenser (150) through a rich $H_2$ line (123).

* * * * *